US010626537B2

(12) United States Patent
Kim et al.

(10) Patent No.: US 10,626,537 B2
(45) Date of Patent: Apr. 21, 2020

(54) WASHING MACHINE

(71) Applicant: LG ELECTRONICS INC., Seoul (KR)

(72) Inventors: Naeun Kim, Seoul (KR); Hwanjin Jung, Seoul (KR); Sanghyun Lee, Seoul (KR); Bonkwon Koo, Seoul (KR); Sunho Lee, Seoul (KR); Dongwon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 328 days.

(21) Appl. No.: 15/283,527

(22) Filed: Oct. 3, 2016

(65) Prior Publication Data
US 2017/0096771 A1 Apr. 6, 2017

(30) Foreign Application Priority Data

Oct. 2, 2015 (KR) .................. 10-2015-0139272
Oct. 2, 2015 (KR) .................. 10-2015-0139279
Oct. 8, 2015 (KR) .................. 10-2015-0141714

(51) Int. Cl.
D06F 39/08 (2006.01)
D06F 37/12 (2006.01)
(Continued)

(52) U.S. Cl.
CPC ............ *D06F 39/003* (2013.01); *D06F 37/12* (2013.01); *D06F 37/40* (2013.01); *D06F 39/02* (2013.01);
(Continued)

(58) Field of Classification Search
CPC ...... D06F 39/088; D06F 39/085; D06F 37/40; D06F 39/12; D06F 39/083; D06F 37/12;
(Continued)

(56) References Cited

U.S. PATENT DOCUMENTS 2,993,357 A * 7/1961 Smith .................. D06F 39/022
134/103.1
3,324,688 A 6/1967 Hubbard, Jr.
(Continued)

FOREIGN PATENT DOCUMENTS

CN 1285430 2/2001
CN 1534131 10/2004
(Continued)

OTHER PUBLICATIONS

Japanese Office Action dated Jan. 9, 2018 issued in Application No. 2016-195649.
(Continued)

*Primary Examiner* — Benjamin L Osterhout
(74) *Attorney, Agent, or Firm* — KED & Associates, LLP

(57) ABSTRACT

A washing machine is provided. The washing machine may include a circulation hose, a water discharge hose, and a pump configured to selectively supply water to the circulation hose and the water discharge hose. The pump may include a pump motor that is reversible and rotatable in a first direction and second direction, an impeller rotated by the pump motor, and a pump housing to provide a space in which the impeller is accommodated. The pump housing may include a supply port, a circulation water discharge port coupled to a second end of the circulation hose, and a water discharge port coupled to the water discharge hose. The water discharge outlet and the circulation water outlet may be arranged in a circumferential direction and spaced apart from each other on a ring-shaped inner surface of the pump housing.

17 Claims, 33 Drawing Sheets

(51) Int. Cl.
  *D06F 39/00* (2020.01)
  *D06F 37/40* (2006.01)
  *D06F 39/02* (2006.01)
  *D06F 39/12* (2006.01)
  *D06F 23/04* (2006.01)
  *D06F 33/02* (2006.01)

(52) U.S. Cl.
  CPC .......... *D06F 39/083* (2013.01); *D06F 39/085* (2013.01); *D06F 39/088* (2013.01); *D06F 39/12* (2013.01); *D06F 23/04* (2013.01); *D06F 33/02* (2013.01); *D06F 2202/10* (2013.01); *D06F 2204/06* (2013.01); *D06F 2204/082* (2013.01); *D06F 2204/10* (2013.01)

(58) Field of Classification Search
  CPC ...... D06F 33/02; D06F 2204/10; D06F 23/04; D06F 2202/10; D06F 2204/06; D06F 2204/082
  See application file for complete search history.

(56) References Cited

U.S. PATENT DOCUMENTS

| | | | |
|---|---|---|---|
| 5,031,427 A | 7/1991 | Pastryk et al. | |
| 5,167,722 A | 12/1992 | Pastryk et al. | |
| 5,271,251 A | 12/1993 | Kovich et al. | |
| 5,582,039 A | 12/1996 | Mueller et al. | |
| 6,125,490 A * | 10/2000 | Riechman | D06F 35/006 68/12.02 |
| 6,269,666 B1 * | 8/2001 | Whah | D06F 39/06 68/12.02 |
| 6,842,929 B2 | 1/2005 | Kim et al. | |
| 6,871,370 B2 * | 3/2005 | Choi | D06F 33/02 68/12.05 |
| 8,733,136 B2 * | 5/2014 | Chung | D06F 39/083 68/207 |
| 9,080,273 B2 * | 7/2015 | Moschutz | D06F 35/006 |
| 2003/0051514 A1 | 3/2003 | Kim et al. | |
| 2004/0163427 A1 | 8/2004 | Oh et al. | |
| 2005/0125909 A1 | 6/2005 | Bellinetto et al. | |
| 2006/0191078 A1 | 8/2006 | Kim | |
| 2007/0067920 A1 * | 3/2007 | Zaccone | D06F 25/00 8/158 |
| 2008/0229517 A1 | 9/2008 | Amarillas et al. | |
| 2009/0229312 A1 | 9/2009 | Chung et al. | |
| 2009/0241270 A1 | 10/2009 | La Belle et al. | |
| 2010/0236001 A1 | 9/2010 | Lee et al. | |
| 2010/0251784 A1 | 10/2010 | Lee | |
| 2010/0281927 A1 | 11/2010 | Lee et al. | |
| 2011/0000558 A1 | 1/2011 | Harwood et al. | |
| 2011/0061172 A1 | 3/2011 | Koo | |
| 2011/0247148 A1 | 10/2011 | Chanda et al. | |
| 2011/0265525 A1 | 11/2011 | Gweon | |
| 2012/0114473 A1 | 5/2012 | Badafem et al. | |
| 2012/0167931 A1 | 7/2012 | Park et al. | |
| 2013/0042416 A1 | 2/2013 | Balinski | |
| 2013/0091635 A1 | 4/2013 | Guzman | |
| 2013/0091726 A1 | 4/2013 | Kim | |
| 2013/0312202 A1 | 11/2013 | Balinski | |
| 2014/0033449 A1 | 2/2014 | Im | |
| 2014/0096327 A1 | 4/2014 | Lee et al. | |
| 2014/0259448 A1 | 9/2014 | Alexander et al. | |
| 2015/0121629 A1 | 5/2015 | Jang | |
| 2015/0211171 A1 | 7/2015 | Favaro et al. | |
| 2015/0240405 A1 | 8/2015 | Kwon et al. | |

FOREIGN PATENT DOCUMENTS

| | | |
|---|---|---|
| CN | 1219928 | 9/2005 |
| CN | 101058932 | 10/2007 |
| CN | 101351588 | 1/2009 |
| CN | 102234897 | 11/2011 |
| CN | 102587091 | 7/2012 |
| CN | 102597354 | 7/2012 |
| CN | 101858023 | 5/2013 |
| CN | 103119212 | 5/2013 |
| CN | 103348052 | 10/2013 |
| CN | 103906871 | 7/2014 |
| CN | 204138949 | 2/2015 |
| EP | 0 464 776 | 1/1992 |
| EP | 2 698 464 | 2/2014 |
| EP | 2 698 467 | 2/2014 |
| EP | 2 719 812 | 4/2014 |
| EP | 2 806 062 | 11/2014 |
| EP | 2 845 941 | 3/2015 |
| GB | 1 200 197 | 7/1970 |
| JP | S 56-098176 | 8/1981 |
| JP | S 62-066895 | 3/1987 |
| JP | H 05-068488 | 9/1993 |
| JP | H 08-173683 | 7/1996 |
| JP | H 09-192383 | 7/1997 |
| JP | H 11-019391 | 1/1999 |
| JP | H 11-276791 | 10/1999 |
| JP | 2000-189693 | 7/2000 |
| JP | 2001-070694 | 3/2001 |
| JP | 2001-300179 | 10/2001 |
| JP | 3434785 | 8/2003 |
| JP | 2004-065638 | 3/2004 |
| JP | 2004-116425 | 4/2004 |
| JP | 2007-029205 | 2/2007 |
| JP | 2007-282934 | 11/2007 |
| JP | 2008-012140 | 1/2008 |
| JP | 2008-073128 | 4/2008 |
| JP | 2009-268848 | 11/2009 |
| JP | 2009-297139 | 12/2009 |
| JP | 2010-046121 | 3/2010 |
| JP | 2010-046125 | 3/2010 |
| JP | 2012-157417 | 8/2012 |
| JP | 2013-188287 | 9/2013 |
| JP | 2014-054277 | 3/2014 |
| JP | 2014-510605 | 5/2014 |
| JP | 2014-100428 | 6/2014 |
| KR | 10-2000-0027871 | 5/2000 |
| KR | 10-2001-0018294 | 3/2001 |
| KR | 10-2001-0018300 | 3/2001 |
| KR | 10-2005-0012524 | 2/2005 |
| KR | 10-2009-0100155 | 9/2009 |
| KR | 10-2009-0122804 | 12/2009 |
| KR | 10-2010-0105339 | 9/2010 |
| KR | 10-2010-0110676 | 10/2010 |
| KR | 10-2010-0110717 | 10/2010 |
| KR | 10-2011-0009918 | 1/2011 |
| KR | 10-2011-0009926 | 1/2011 |
| KR | 10-2011-0086421 | 7/2011 |
| KR | 10-2012-0011940 | 2/2012 |
| KR | 10-2012-0012216 | 2/2012 |
| KR | 10-2012-0040793 | 4/2012 |
| KR | 10-2013-0034311 | 4/2013 |
| KR | 10-2013-0109354 | 10/2013 |
| KR | 10-2014-0030187 | 3/2014 |
| KR | 10-2015-0099114 | 8/2015 |
| RU | 2 495 174 | 10/2013 |
| WO | WO 2009/102106 | 8/2009 |
| WO | WO 2013/035279 | 3/2013 |

OTHER PUBLICATIONS

Japanese Office Action dated Jan. 9, 2018 issued in Application No. 2016-195781.
Australian Office Action dated Aug. 2, 2017 issued in Application No. 2016234988.
Derwent Abstract of WO 2013035279 A1 (cited above) (Year: 2013).
Russian Notice of Allowance dated Nov. 23, 2017 issued in Application No. 2016138672/12(061605).
Australian Office Action dated Dec. 5, 2017 issued in Application No. 2016234990.
U.S. Office Action dated Feb. 12, 2018 issued in co-pending U.S. Appl. No. 15/283,763.
Korean Office Action dated Jul. 1, 2016 issued in Application No. 10-2015-0139276.

(56) References Cited

OTHER PUBLICATIONS

Korean Office Action dated Aug. 2, 2016 issued in Application No. 10-2015-0139277.
Korean Notice of Allowance dated Dec. 5, 2016 issued in Application No. 10-2015-0139275.
Japanese Office Action dated Dec. 19, 2017 issued in Application No. 2016-195750.
Korean Office Action dated Jul. 13, 2016 issued in Application No. 10-2015-0141714.
Korean Office Action dated Aug. 18, 2016 issued in Application No. 10-2015-0139272.
Korean Office Action dated Feb. 28, 2017 issued in Application No. 10-2015-0139279.
Russian Search Report dated Sep. 6, 2017 issued in Application No. 2016138670/12(061603).
Korean Office Action dated Sep. 26, 2017 issued in Application No. 10-2015-0139279.
Russian Office Action (with full English translation) dated Oct. 17, 2017 issued in Application No. 2016138669/12(061602).
Australian Office Action dated Nov. 10, 2017 issued in Application No. 2016234984.
United States Office Action dated Apr. 13, 2018 issued in co-pending related U.S. Appl. No. 15/283,488.
United States Office Action dated May 3, 2018 issued in co-pending related U.S. Appl. No. 15/283,662.
Chinese Office Action dated Sep. 20, 2018 issued in Application No. 201610877950.1 (with English Translation).
Chinese Office Action dated Sep. 4, 2018 issued in Application No. 201610881043.4 (English translation attached).
U.S. Appl. No. 15/283,763, filed Oct. 3, 2016.
Indian Office Action dated Mar. 11, 2019 issued in Application No. 201634033588.
United States Office Action dated Jan. 10, 2019 issued in co-pending related U.S. Appl. No. 15/283,571.
Chinese Office Action dated Oct. 12, 2018 issued in Application No. 201610880710.7 (with English Translation).
U.S. Office Action dated May 16, 2019 issued in U.S. Appl. No. 15/283,601.
U.S. Final Office Action dated Oct. 7, 2019 issued in related U.S. Appl. No. 15/283,488.
U.S. Appl. No. 15/283,488, filed Oct. 3, 2016.
U.S. Appl. No. 15/283,571, filed Oct. 3, 2016.
U.S. Appl. No. 15/283,601, filed Oct. 3, 2016.
U.S. Appl. No. 15/283,662, filed Oct. 3, 2016.

* cited by examiner

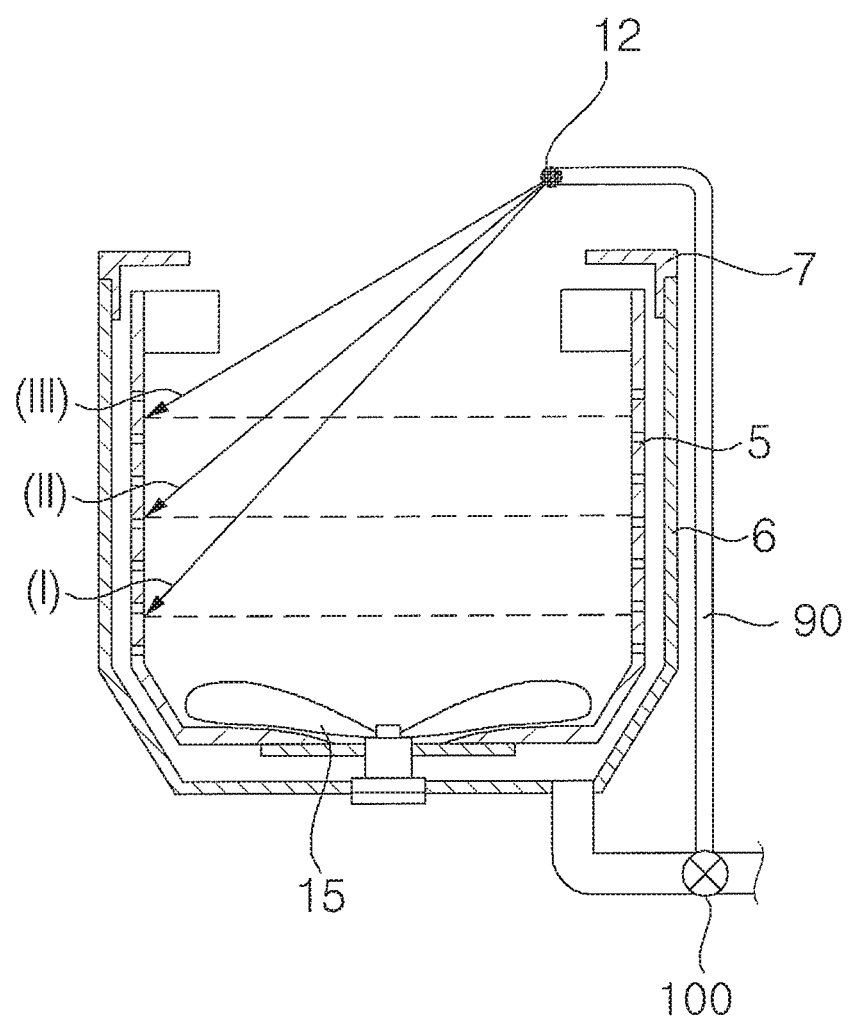

WASHING MACHINE

CROSS-REFERENCE TO RELATED APPLICATIONS

This application claims priority under 35 U.S.C. § 119 to Korean Application Nos. 10-2015-0139279 filed on Oct. 2, 2015, 10-2015-0139272 filed on Oct. 2, 2015, and 10-2015-0141714 filed on Oct. 8, 2015, whose entire disclosures are incorporated herein by reference.

BACKGROUND

1. Field

Embodiments relate to a washing machine.

2. Background

In general, a washing machine is an apparatus that may process laundry through several actions, such as, e.g., washing, dehydration and/or drying. The washing machine may include an outer tub configured to store water and an inner tub rotatably provided in the outer tub. A plurality of through holes through which water passes may be formed in the inner tub.

When a user selects a required course using a control panel in the state in which laundry (hereinafter referred to as "fabrics"), for example, clothes or bedclothes, has been thrown into the inner tub, the washing machine may execute a predetermined algorithm in response to the selected course, so that fast water discharge, washing, rinsing, and dehydration may be performed.

A washing machine may include a circulation nozzle configured to spray water discharged from an outer tub to an inner tub and a circulation pump provided on a passage connecting the outer tub and the circulation nozzle and configured to forcibly send water to the circulation nozzle. However, the washing machine may include a water discharge pump to allow drainage of water in the outer tub to an outside through a water discharge passage. If the circulation nozzle is used, two pumps may be required. Accordingly, there may be problems in that a structure of the washing machine becomes complicated, and production costs may be increased.

BRIEF DESCRIPTION OF THE DRAWINGS

The embodiments will be described in detail with reference to the following drawings in which like reference numerals refer to like elements wherein:

FIG. 11A is a diagram showing heights at which water sprayed through the circulation nozzle reaches the inner tub depending on a rotation speed of a washing motor;

DETAILED DESCRIPTION

Figure 1:
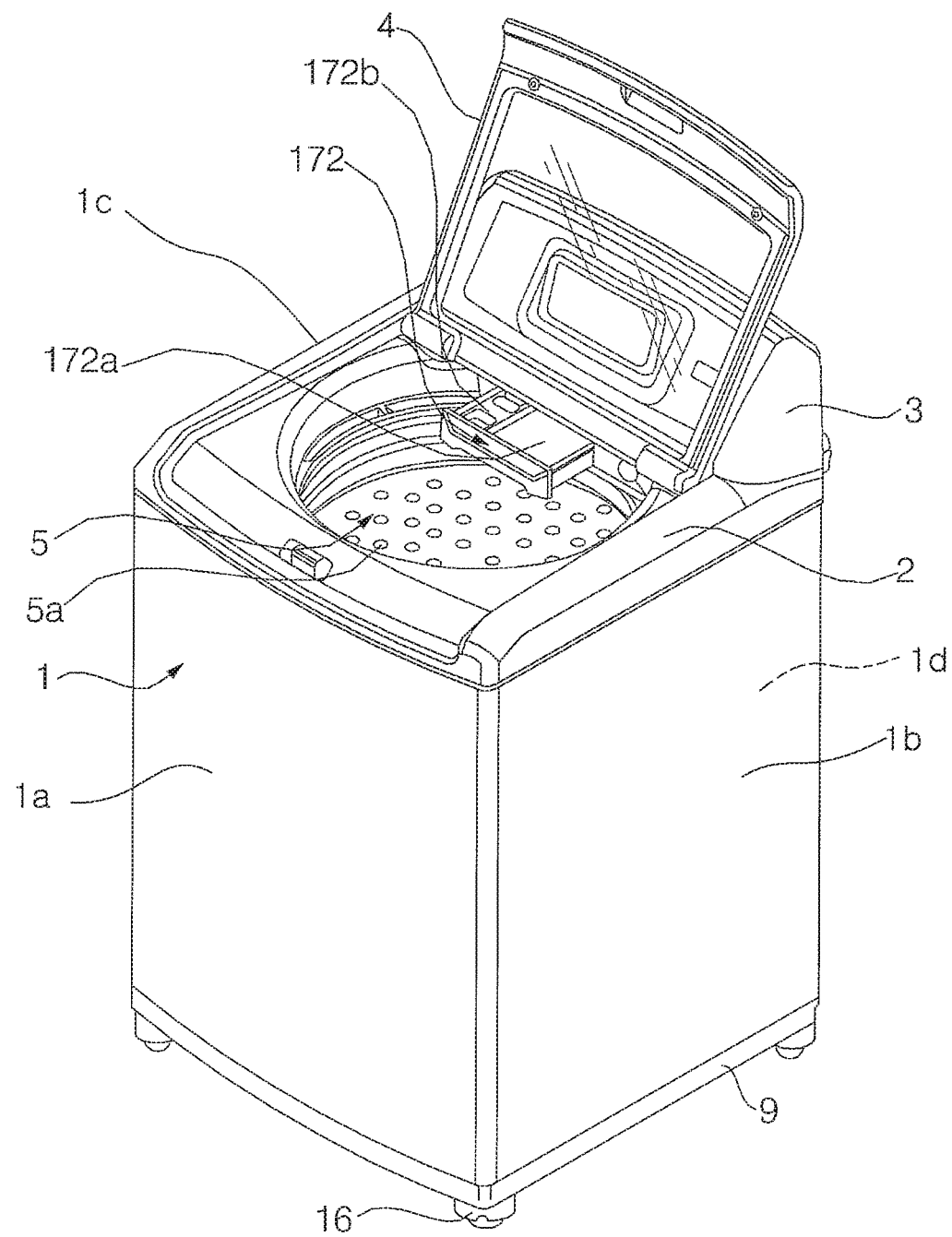
FIG. 1 is a perspective view of a washing machine according to an embodiment.
Figure 2:
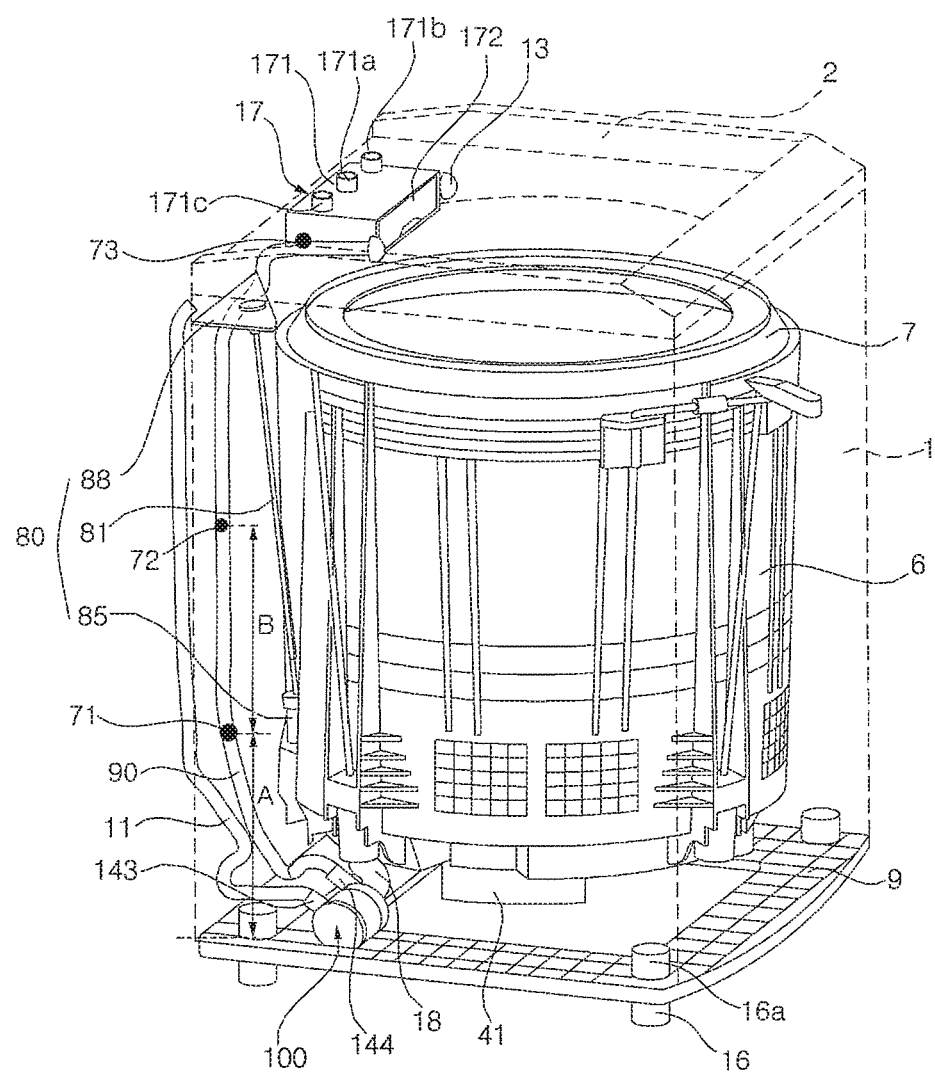
FIG. 2 is a side cross-sectional view of the washing machine shown in FIG. 1.

Referring to FIGS. 1 to 4, the washing machine according to an embodiment may include a base 9, a cabinet 1, a top cover 2, a lid 4, and a control panel 3. The base 9 may have a flat form corresponding to a bottom on which the washing machine is installed. The base 9 may be supported by four support legs 16 installed near the four corners of the cabinet 1. A pump 100 may be installed on the base 9.

The base 9 forms an external appearance of an approximately rectangular form. The support legs 16 are provided at respective points inward spaced apart from the four vertexes of a rectangular form. The support legs 16 are protruded downward from the base 9 and come into contact with the bottom (e.g., an indoor floor on which the washing machine stands). The four support legs 16 support the base 9, and the base 9 supports the entire washing machine.

The cabinet 1 is supported by the base 9, and is configured to include a front part 1*a*, both side units 1*b* and 1*c*, and a backside unit 1*d* installed on the outside corners of the base 9 so that the space in which the outer tub 6 is accommodated is formed within the cabinet 1. The top and bottom of the cabinet 1 may be opened. The top cover 2 may be coupled to the top of the cabinet 1. A feeding entrance for laundry or clothes may be formed in the top cover 2. The lid 4 for opening and shutting the feeding entrance may be rotatably coupled to the top cover 2.

The outer tub 6 for receiving water may be provided in the cabinet 1. The outer tub 6 may be provided in a form hung within the cabinet 1 by a hanger 80. The hanger 80 may include a support rod 81 configured to have a top pivotally coupled to the top cover 2 and a suspension installed on the support rod 81 and configured to absorb vibration of the outer tub 6. The suspension may have various forms. For example, the suspension may include an outer tub support member configured to support the outer tub 5 and to move along the support rod 81 when the outer tub 6 is vibrated and a spring fixed to the lower part of the support rod 81 and configured to elastically support the outer tub support member.

Figure 3:
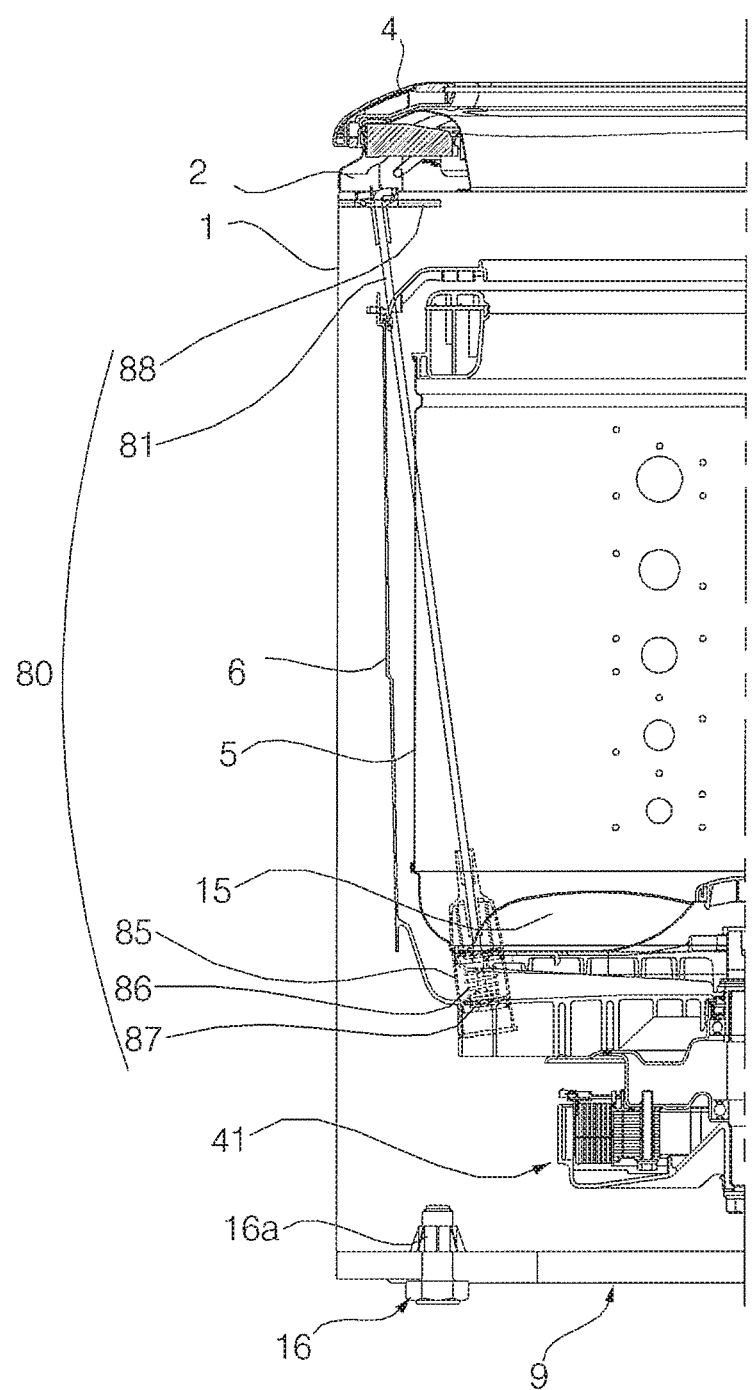
FIG. 3 shows part of the washing machine of FIG. 1 and is a cross-sectional view showing a structure of a hanger.

Referring to FIG. 3, a hanger bracket 88 may be provided above the outer tub 6 within the cabinet 1. The hanger bracket 88 may be provided in the top cover 2. The support rod 81 may have a top pivotally coupled to the hanger bracket 88. The hanger 800 may include the support rod 81, a cap 85, and an elastic member 86.

The cap 85 can move along the support rod 81 in the state in which it has been inserted into the support rod 81. The outer tub 6 is supported by the cap 85, and moves along with the cap 85 during vibration. The support rod 81 may include a support rod base 87 formed at the lower part of the support rod. The base 87 has a form outward extended from a bottom of the support rod 81 in a radial direction. The elastic member 86 provided in the cap 85 is placed on the top surface of the support rod base 87.

The elastic member 86 may be a spring. A top of the spring supports the cap 85. Accordingly, the spring 86 is compressed when the cap 85 moves downward while the cap 85 is displaced along with the outer tub 6. The spring 86 restores to its original state when the cap 85 moves upward. The hanger bracket 88 may be provided near each of the four corners of the cabinet 1 and/or the top cover 2. The four hangers 80 may be coupled to the respective hanger brackets 88. When viewed from top to bottom, the hangers 80 are installed near the four corners of the cabinet 1.

The outer tub 6 may have a top open, and an outer tub cover 7 may be provided at the open top. The outer tub cover 7 may have a ring form having a central part open for the entrance and exit of laundry. The inner tub 5 configured to accommodate laundry and rotated around a vertical axis may be provided in the outer tub 6. A plurality of holes 5*a* through which water pass may be formed in the inner tub 5. Water may move between the inner tub 5 and the outer tub 6 through the holes 5*a*.

A water discharge bellows 18 for discharging water from the outer tub 6 and a water discharge valve 44 for controlling the water discharge bellows 18 may be provided. The water discharge bellows 18 is connected to the pump 100. Water may be supplied to the pump 100 through the water discharge bellows 18 when the water discharge valve 44 is open under the control of a controller 30. The pump 100 may be construed as operating in the state in which the water discharge bellows 18 is open, although not separately described.

A pulsator 15 is rotatably provided at the bottom within the inner tub 5. The pulsator 15 may include a plurality of radial ribs that is upward protruded. When the pulsator 15 is rotated, a water current may be formed by the ribs.

A washing motor 41 that provides electric power for rotating the inner tub 5 and the pulsator 15 may be provided in the cabinet 1. The washing motor 41 is provided under the outer tub 6 and may be provided in a form hung in the cabinet 1 along with the outer tub 6. The shaft of the washing motor 41 may be coupled to the pulsator 15, and may be coupled to or released from the inner tub 5 in response to the switch operation of a clutch. Accordingly, when the shaft of the washing motor 41 operates in the state in which it has been coupled to the inner tub 5, the pulsator 15 and the inner tub 5 are rotated together. In the state in which the shaft has been separated from the inner tub 5, the inner tub 5 is in a stop state and only the pulsator 15 is rotated.

Speed of the washing motor 41 can be controlled. The washing motor 41 may be controlled under control of the controller 30. The washing motor 41 may be a brushless direct current (BLDC) motor. Speed of the BLDC motor may be controlled using a proportional-integral (PI) controller, a proportional-integral-derivative (PID) controller, etc. Such controllers may receive output of the motor through feedback and control the input current of the motor.

At least one pump is required to drain water from the outer tub 6 or to circulate water through a circulation hose or first hose 10. A pump for water discharge and a pump for circulation may be separately provided. Water discharge and circulation may be selectively performed using a single pump 100.

The circulation hose 10 may guide water, forcibly sent by the pump 100, into a circulation nozzle 12. The circulation hose 10 may have one end connected to a circulation water discharge port or first port 144 and have another end connected to the circulation nozzle 12. The circulation water discharge port 144 is protruded in the lateral direction of the pump 100 and coupled to one end of the circulation hose 10. The circulation water discharge port 144 may horizontally protrude and also extend in an upward inclined direction. The circulation water discharge port 144 may be backward and upward extended.

The pump 100 may include a pump motor 170 and an impeller 150 rotated by the pump motor 170 and configured to forcibly send water. The pump motor 170 may be rotated forward/backward or in a first/second direction. A rotation direction of the impeller 150 is also changed in response to a rotation direction of the pump motor 170.

The pump motor 170 is capable of speed control, and may be controlled under control of the controller 30. The pump motor 170 may be a brushless direct current (BLDC) motor. Speed of the BLDC motor may be controlled using a proportional-integral (PI) controller, a proportional-integral-derivative (PID) controller, etc. Such controllers may receive output of the motor through feedback and control the input current of the motor.

The pump 100 may include two ports for discharging water forcibly sent by the impeller, that is, a circulation water discharge port or first port 144 and a water discharge port or second port 143. When the pump motor 170 is rotated forward, water is discharged through the circulation water discharge port 144. When the pump motor 170 is rotated backward, water may be discharged through the water discharge port 143.

A dispenser 17 for supplying additives that act on laundry to the inner tub 5 along with water may be provided in the top cover 2. The additives supplied from the dispenser 17 may include, for example, a detergent and a fabric softener. The dispenser 17 may include a dispenser housing 171 provided in the top cover 2 and a drawer 172 configured to have additives contained therein and received in the dispenser housing 171 in such a way as to be drawn therefrom. A drawer inlet/outlet port through which the drawer 172 passes may be formed in the top cover 2. An opening part corresponding to the drawer inlet/outlet port may be formed on one surface that belongs to the dispenser housing 171 and that faces the drawer inlet/outlet port. An inside of the drawer 172 may be partitioned by a detergent reception unit 172a in which a detergent is contained and a fabric softener reception unit 172b in which a fabric softener is contained.

A plurality of water supply ports may be formed at the top of the dispenser housing 171. The water supply ports may include a first water supply port 171a and a second water supply port 171b into which hot water and cold water to be supplied to the detergent reception unit 172a are respectively introduced and a third water supply port 171c into which cold water or hot water to be supplied to the fabric softener reception unit 172b is introduced. Hereinafter, cold water is illustrated as being introduced into the third water supply port 171c. In some embodiments, however, hot water may be introduced into the third water supply port 171c.

The washing machine may include one or more water supply hoses for guiding water supplied from an external water source, for example, a tap. The water supply hoses may include a first water supply hose for guiding water supplied from a cold water source into the first water supply port 171a, a second water supply hose for guiding water supplied from a hot water source into the second water supply port 171b, a third water supply hose for guiding water supplied from the cold water source into the third water supply port 171c, and a fourth water supply hose or a direct water supply hose for supplying water to a direct water nozzle 13.

Cold water may be supplied through the direct water supply hose. The fourth water supply hose may be coupled to a water source. In some embodiments, however, the fourth water supply hose may be coupled to the first water supply hose or the third water supply through a fluid connection, but is not limited thereto. In some embodiments, cold water, hot water or a mixture of cold water and hot water may be supplied through the water supply hose.

One or more water supply valves 43 for controlling the water supply hoses may be provided. For example, the one or more water supply valves 43 may include a first water supply valve for controlling the first water supply hose, a second water supply valve for controlling the second water supply hose, a third water supply valve for controlling the third water supply hose, and a fourth water supply valve for controlling the direct water supply hose. The water supply valves may be driven under the control of the controller 30.

The washing machine may include a water level sensor 42 for sensing a water level in the outer tub 6. The controller 30 may control the water supply valves 43 and/or the water discharge valve 44 in response to a water level sensed by the water level sensor 42. The control panel 3 may include an input unit 46, such as, e.g., keys, buttons and/or a touch panel capable of setting, selecting, and adjusting various types of operation mode provided by the washing machine, and a display, such as a lamp, an LCD panel and/or an LED panel for displaying various types of information such as a response, warning, and notification depending on the operation state of the washing machine and the selection of operation mode. A memory 47 may store various data for operation of the washing machine and may include various recording media, such as, e.g., volatile/nonvolatile RAM, ROM and/or flash memory.

Referring to FIGS. 6 to 10C, the washing machine may include a circulation nozzle 12 and a direct water nozzle 13, that is, nozzles for spraying water to the inner tub 5. The circulation nozzle 12 and the direct water nozzle 13 may be installed on the top cover 2 and may be provided on both sides with the drawer 172 interposed therebetween. The circulation nozzle 12 and the direct water nozzle 13 may be installed above the outer tub 6. The circulation nozzle 12 may be provided at the back above the outer tub 6.

When viewed from a front, in the case of left and right sides divided based on the dispenser 17, the circulation nozzle 12 may be provided on one side and the direct water nozzle 13 may be provided on the other side. The pump 100 may be provided on the same side as the circulation nozzle 12 based on the dispenser 17 over the base 9.

In an embodiment, when viewed from the front, the circulation nozzle 12 may be provided on the left of the dispenser 17 and the pump 100 is also provided on the same side as the circulation nozzle 12. In some embodiments, however, if the circulation nozzle 12 is provided on the opposite side, for example, the right of the dispenser 17, the pump 100 may also be provided on the right of the dispenser 17.

The circulation nozzle 12 may include a water supply pipe 121 for guiding water supplied through a circulation hose 90 and a diffuser 122 for spraying water, discharged by the water supply pipe 121, to the inner tub 5 by refracting the water downward. The circulation nozzle 12 may be formed of one part made of synthetic resin. The water supply pipe 121 may be straightly extended from an inlet 121a into which water from the direct water supply hose is introduced to an outlet 121b for discharging water to the diffuser 122. The outlet 121b may have a smaller diameter than the inlet 121a so that pressure of water discharged through the outlet 121b is increased.

A radial protrusion 125 protruded from the outer circumferential surface of the water supply pipe 121. A pair of the radial protrusions 125 may be formed at locations that are symmetrical around the center of the water supply pipe 121. A hose coupling protrusion 126 may extrude from the outer circumferential surface of the water supply pipe 121. A protrusion coupling groove into which the hose coupling protrusion 126 is inserted may be formed on the inner circumferential surface of the circulation hose 10.

The circulation nozzle 12 may include a plate 123 outward extended from the outer circumferential surface of the water supply pipe 121 in the radial direction. The back of the plate 123 faces the front of the top cover 2, and the diffuser 122 may be formed on the front surface of the plate 123.

The diffuser 122 may include a collision surface 124 in which water discharged through the outlet 121b of the water supply pipe 121 collides against each other and is downward refracted. The diffuser 122 includes a spray hole 122h protruded to the front of the plate 123 and configured to spray water into the inner tub 5. That is, the diffuser 122 has a chamber or funnel form depressed from the spray hole 122h, and may have an increasing channel section area from the outlet 121b of the water supply pipe 121 to the spray hole 122h. A portion that belongs to the inside surface of the diffuser 122 forming the chamber and that is placed at the front end of the outlet 121*b* of the water supply pipe 121 is inclined so that water discharged by the outlet 121*b* is downward refracted while colliding against each other. The inclined portion corresponds to the collision surface 124.

The circulation nozzle 12 may further include an inclined part 123*a* protruded from the plate 123 and configured to extend from the side over the spray hole 122*h* to the spray hole 122*h* and to have a slope further protruded from the plate 123 to the spray hole 122*h*. A gap is formed between the end of the inclined part 123*a* and the front surface of the top cover 2. Accordingly, although water flows along the inclined part 123*a* and drops through the spray hole 122*h*, the dropped water can be prevented from coming into contact with the top cover 2.

A fixed protrusion 128 may be protruded from the back surface of the plate 123. The fixed protrusion 128 may include a pin 128*a* vertically extended from the back surface of the plate 123 and a head 128*b* configured to have a greater outside diameter than the pin 128*a* and formed at the end of the pin 128*a*.

An opening part 123*h* may be formed in the plate 123. A locking tab 127 may be lengthily protruded from the corner of the opening part 123*h* to the opening part 123*h*. The locking tab 127 has an end of a cantilever form located within the opening part 123*h*, and may be curved from a connection part with the plate 123. A pressurization protrusion 127*a* protruded in a direction to which the back of the plate 123 is directed may be formed at the end of the locking tab 127.

A nozzle mount 2*a* of a backward depressed form may be formed in the front surface of the top cover 2. A first installation hole h1 and a second installation hole h2 of an arc shape spaced apart from the first installation hole h1 and extended in a circumferential direction with respect to the center of the first installation hole h1 or the center of the water supply pipe 121 may be formed in the nozzle mount 2*a*.

The first installation hole h1 may include a circular water supply pipe insertion section h11 configured to have the water supply pipe 121 inserted thereto, first and second radial protrusion insertion sections h12 and h13 extended from the water supply pipe insertion section h11 to both sides in a radial direction thereof, and a pressurization protrusion insertion section h14 further extended from the second radial protrusion insertion section h13 in the radial direction.

The second installation hole h2 may include a head insertion section h21 configured to have the head 128*b* inserted thereto when the radial protrusions 125 is inserted into the first and the second radial protrusion insertion sections h12 and h13, respectively, and a protrusion guide section h22 extended from the head insertion section h21 in a circumferential direction thereof in a width smaller than the width of the head insertion section h21.

A process of installing the circulation nozzle 12 is described below. The locations of radial protrusions 125 are aligned with the radial protrusion insertion sections h12 and h13. The water supply pipe 121 is inserted into the water supply pipe insertion section h11 from the front of the top cover 2. At this time, the head 128*b* of the fixed protrusion 128 is also inserted into the head insertion section h21. The back surface of the plate 123 is placed on the front surface of the top cover 2. The pressurization protrusion 127*a* of the locking tab 127 has closely adhered to the front surface of the top cover 2, and thus the locking tab 127 is elastically curved from a connection part with the plate 123.

When the circulation nozzle 22 is rotated, the head 128*b* moves along the protrusion guide section h22. The pressurization protrusion 127*a* of the locking tab 127 revolves around the front surface of the top cover 2 in the state in which the pressurization protrusion 127*a* of the locking tab 127 has been deformed. When the pressurization protrusion 127*a* reaches a specific location, it is inserted into the locking tab insertion section h14 and restores to its original form, thereby completing the installation of the circulation nozzle 12.

In the state in which the installation of the circulation nozzle 12 has been installed, the radial protrusion 125 is located on the back surface of the top cover 2. Accordingly, the circulation nozzle 12 does not deviate toward the front side of the first installation hole h1. Furthermore, since the fixed protrusion 128 is also located in the protrusion guide section h22 having a width smaller than the diameter of the head 128*b*, the head 128*b* does not pass through the guide section h22 and the circulation nozzle 12 does not deviate toward the front side of the first installation hole h1. Furthermore, the spray direction of the circulation nozzle 12 may be set as required by properly designing the length of the protrusion guide section h22 and the locations of the locking tab 127 and the insertion section h14 corresponding to the locking tab 127.

Figure 11B:
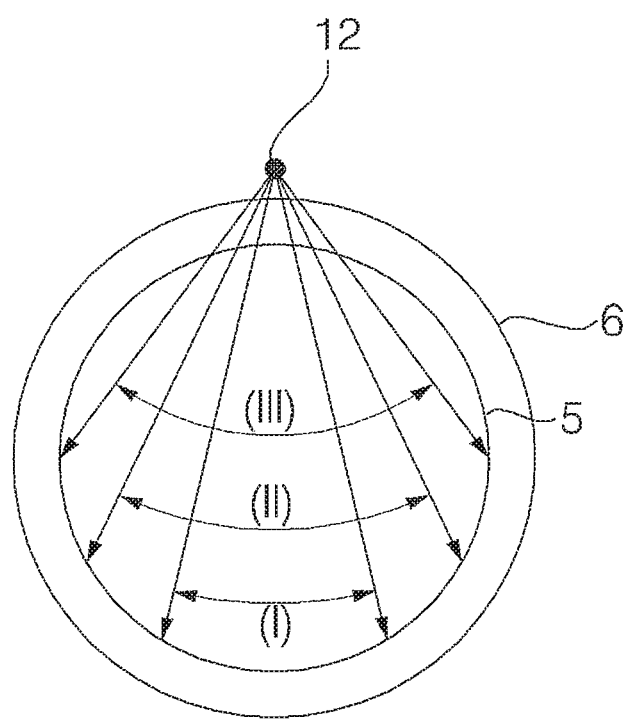
FIG. 11B is a diagram showing angles at which water sprayed through the circulation nozzle is spread in a width direction depending on a rotation speed of the washing motor.
Figure 12:
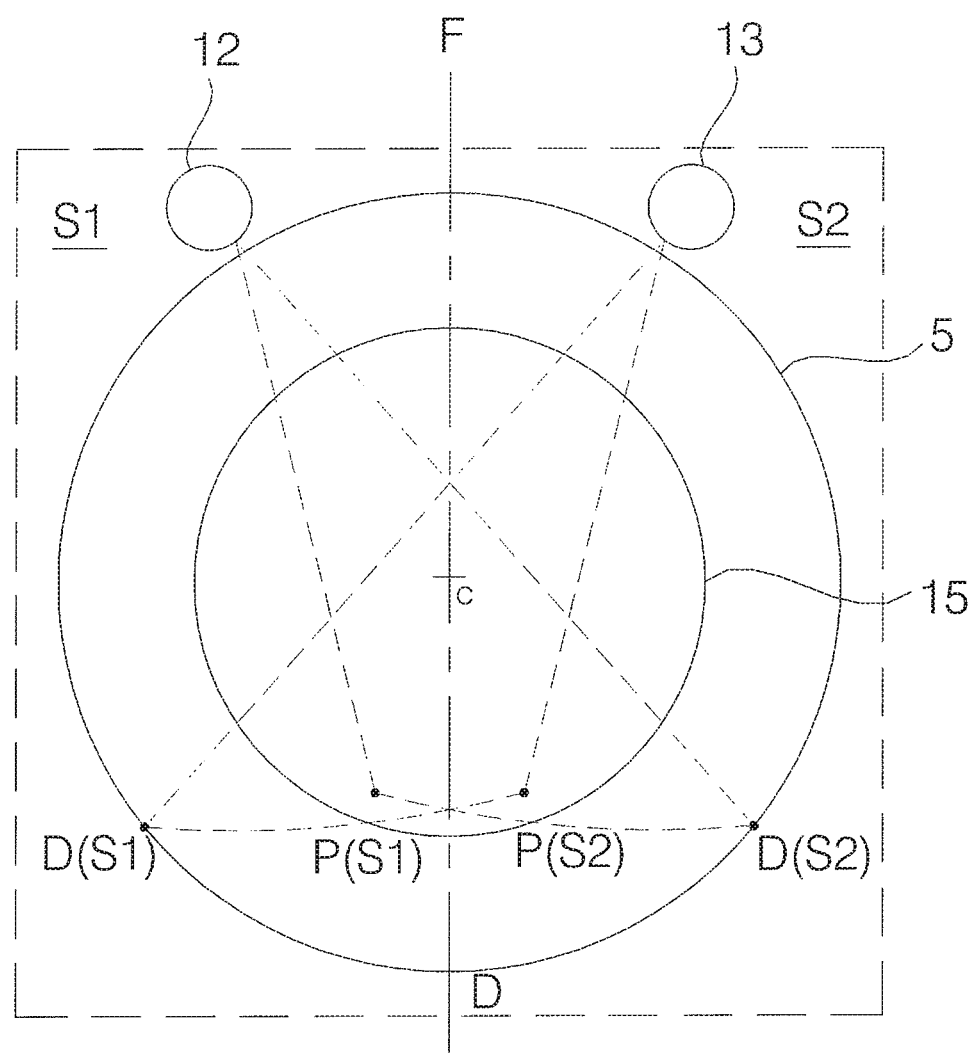
FIG. 12 is a diagram showing spray ranges of the circulation nozzle and a direct water nozzle.

Referring to FIGS. 11 and 12, when water of sufficient water pressure is supplied through the water supply pipe 121, the water sprayed through the spray hole 122*h* may be spread at a maximum spray width angle θw left and right when viewed from the front and may be upward sprayed at a maximum vertical spray angle θv with respect to a vertical line when viewed from the side, but the width of a water current sprayed through the circulation nozzle 12 and a maximum height reached by the water current are reduced as the water pressure supplied through the water supply pipe 121 is reduced.

Water pressure of water supplied through the water supply pipe 121 is changed depending on a rotation speed of the pump motor 170. The controller 30 may control a form of a water current sprayed through the circulation nozzle 12 by changing a rotation speed of the pump motor 170. That is, in order that the pump motor 170 is rotated at a low speed (I), rotated at a middle speed (II), and rotated at a high speed (III), a maximum height at which a water current sprayed through the circulation nozzle 12 reaches the inner tub 5 is sequentially increased (see FIG. 11A) and the horizontal spray angle of the circulation nozzle 12 is sequentially increased (see FIG. 11B).

Figure 4:
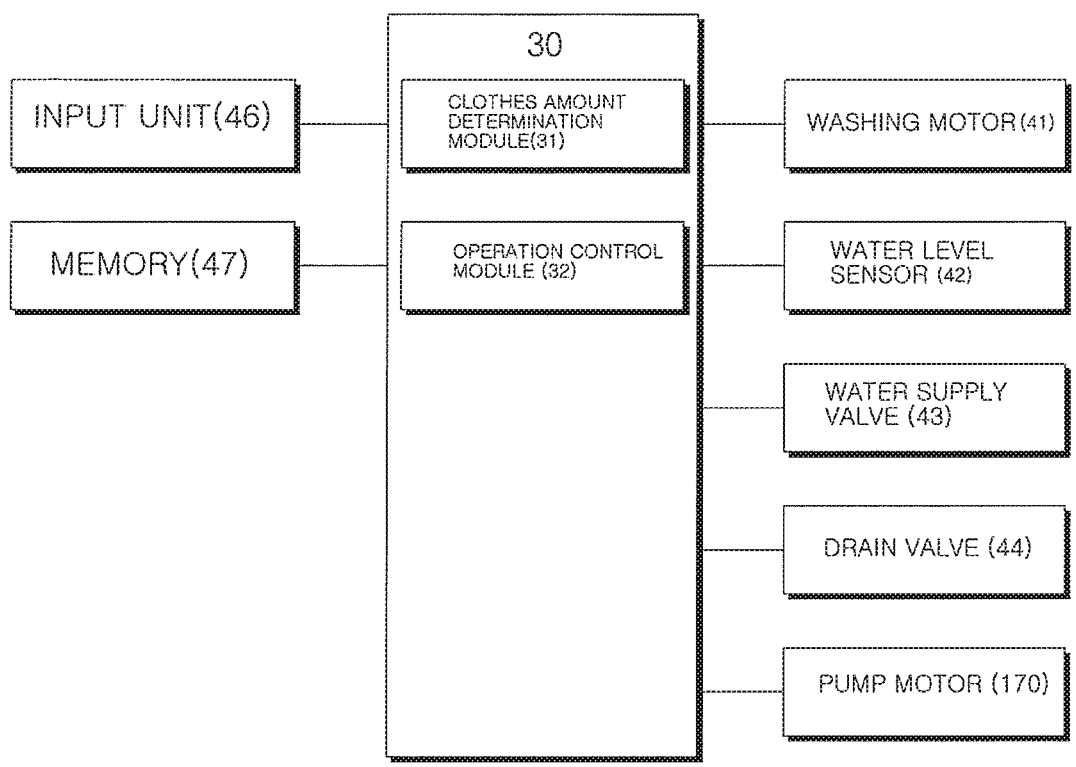
FIG. 4 is a block diagram showing a relationship between major elements of the washing machine of FIG. 1.
Figure 5A:
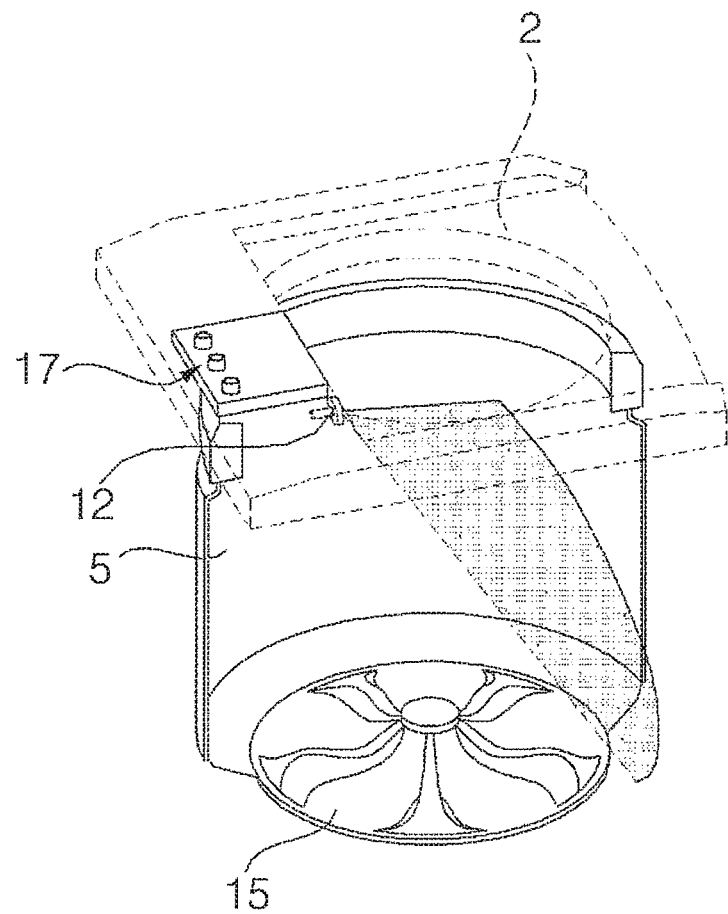
FIG. 5A shows a state in which water is sprayed through a circulation nozzle if an inner tub has no laundry load.
Figure 5B:
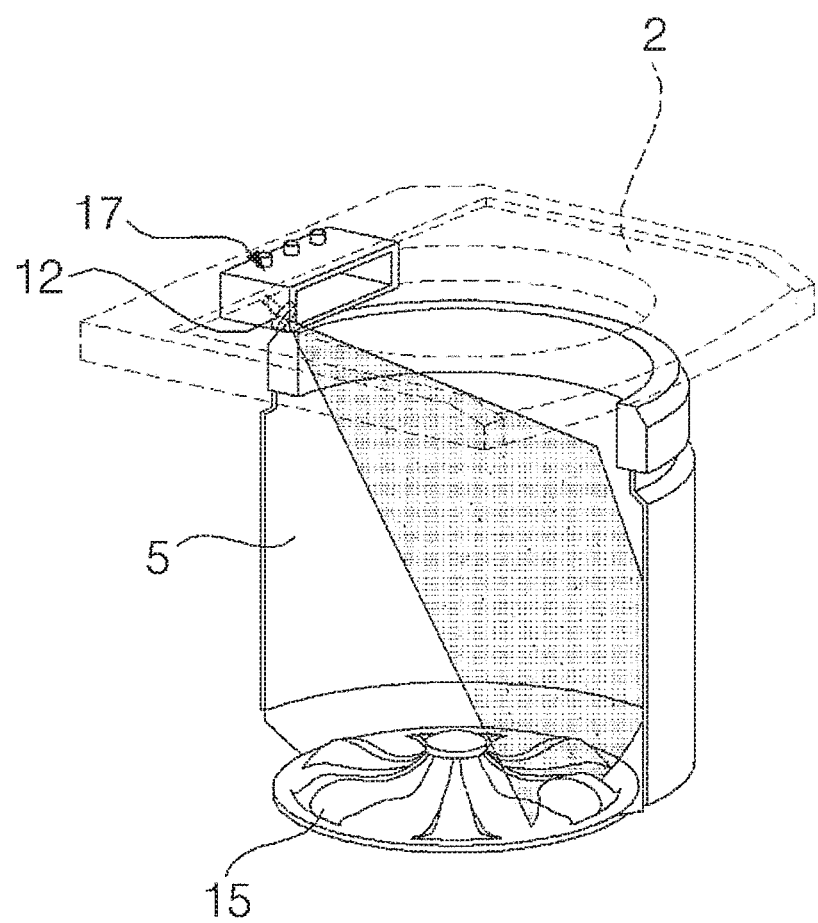
FIG. 5B shows a state in which water is sprayed through the circulation nozzle if the inner tub has a maximum load of laundry.
Figure 6:
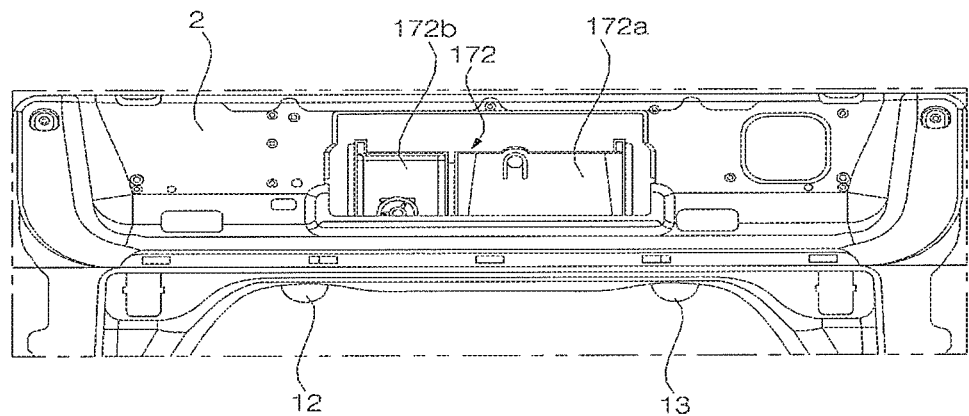
FIG. 6 shows a top cover of a washing machine according to an embodiment.
Figure 7:
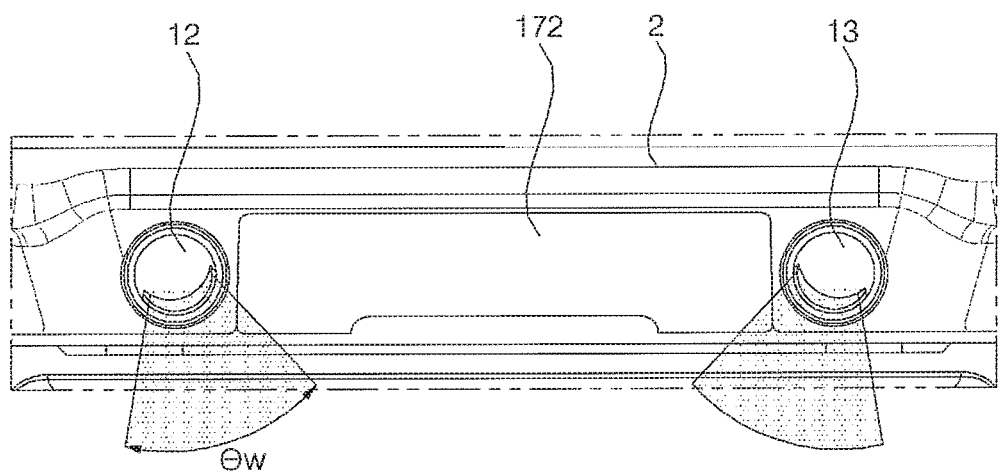
FIG. 7 shows that the top cover viewed from a front.

The controller 30 may include a clothes or laundry amount determination module 31 and an operation control module 32 (refer to FIG. 4). The clothes amount determination module 31 may determine the amount of clothes or laundry contained in the inner tub 5 (hereinafter referred to as a "clothes amount"). Inertia of the inner tub 5 or the pulsator 15 may be an index for determining a clothes amount. For example, when the inner tub 5 in a stop state is rotated, stop inertia of the inner tub 5 is increased as a clothes amount is increased. Accordingly, more time is taken for the inner tub 5 to reach a set target speed. Accordingly, the clothes amount determination module 31 may determine a clothes amount based on the time taken for the inner tub 5 to the target speed.

When the rotating inner tub 5 is braked, the clothes amount determination module 31 may determine a clothes amount based on the time taken for the inner tub 5 to stop. In this case, rotation inertia of the inner tub 5 that is changed depending on a clothes amount is used. A clothes amount may be determined by taking into consideration a change of an input or output current of the washing motor 41 and/or an electromotive force. A method of calculating a clothes amount may be widely known to those skilled in the art and a description thereof has been omitted, but the clothes amount determination module 31 may determine a clothes amount using various known methods.

The operation control module 32 may control various electronic devices, such as, e.g., the washing motor 41, the water supply valve 43, the water discharge valve 44, and the pump motor 170. The operation control module 32 may control the electronic devices based on a water level sensed by the water level sensor 42 or a clothes amount determined by the clothes amount determination module 31.

The operation control module 32 may control the water supply valve 43 so that water is supplied to the inner tub 5, and then may control a rotation speed of the pump motor 170 based on a clothes amount determined by the clothes amount determination module 31. In particular, the operation control module 32 may increase the rotation speed of the pump motor 170 as the clothes amount determined by the clothes amount determination module 31 increases. If the amount of clothes thrown into the inner tub 5 is much, the operation control module 32 increases the maximum spray width angle θw and the maximum vertical spray angle θv by increasing spray water pressure of the circulation nozzle 12.

The operation control module 32 may continue to rotate the washing motor 41 in one direction while the pump motor 170 is rotated. At this time, the washing motor 41 may be rotated at a sufficient speed to the extent that it is rotated along with the inner tub 5 in the state in which clothes within the inner tub 5 have adhered to the inside surface of the inner tub, that is, a drum D by a centrifugal force. In this case, there is an advantage in that water sprayed through the circulation nozzle 12 may dampen clothes uniformly.

Figure 8A:
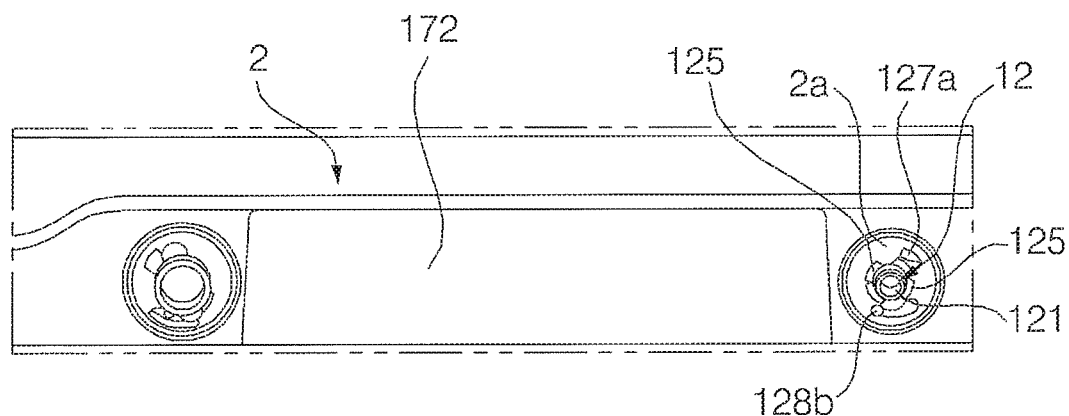
FIG. 8A shows a back of the top cover as viewed in a state in which the circulation nozzle has been installed.
Figure 8B:
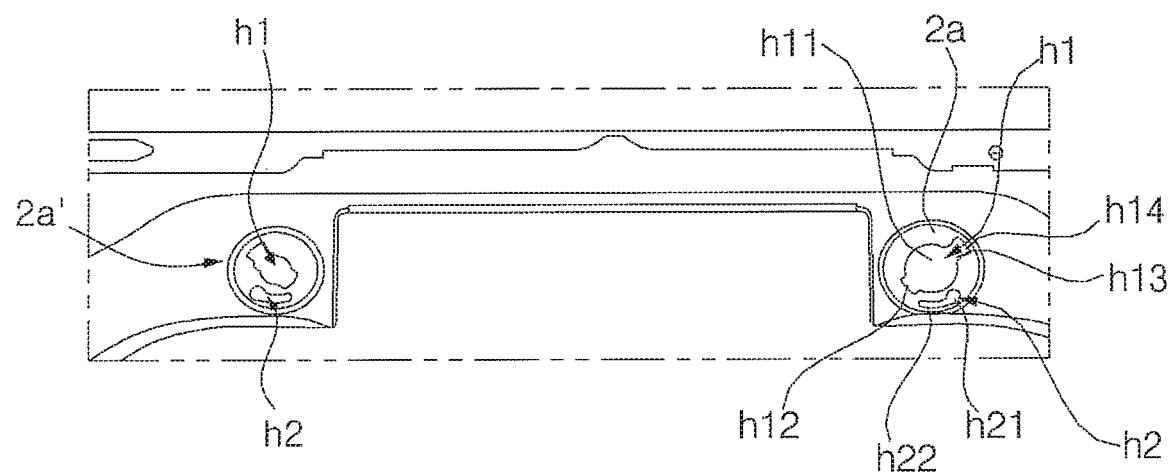
FIG. 8B shows the back of the top cover as viewed in a state in which the circulation nozzle has been separated.
Figure 9A:
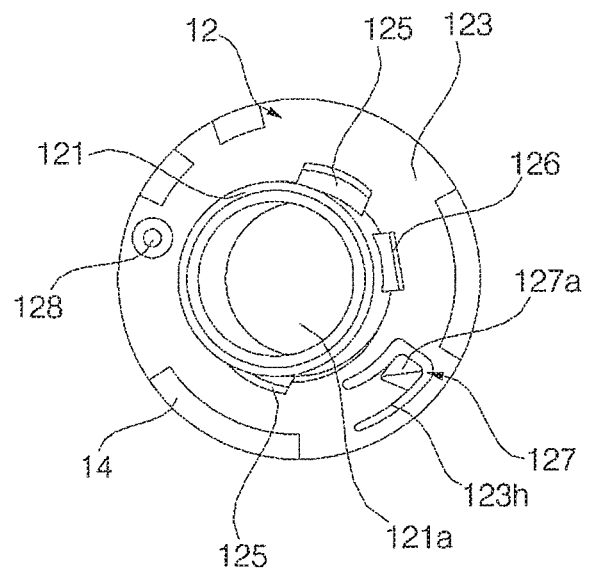
FIG. 9A shows a back part of the circulation nozzle.
Figure 9B:
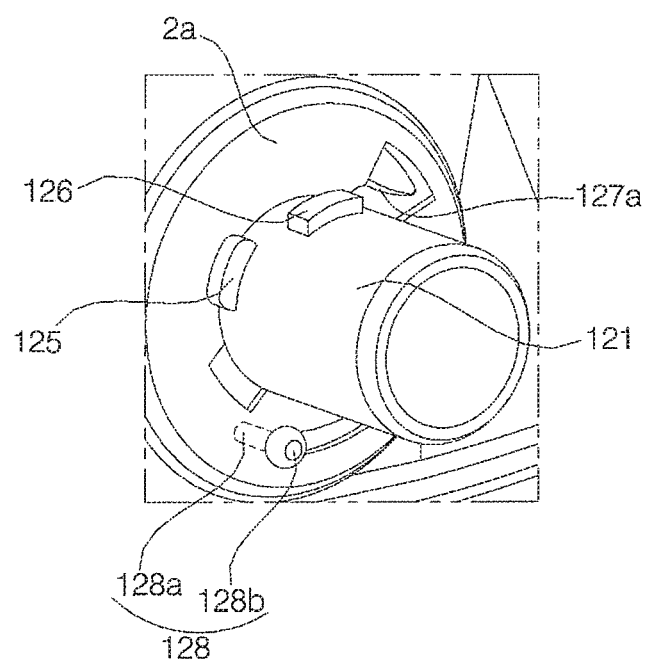
FIG. 9B shows a coupling of the top cover and the circulation nozzle.
Figure 10A:
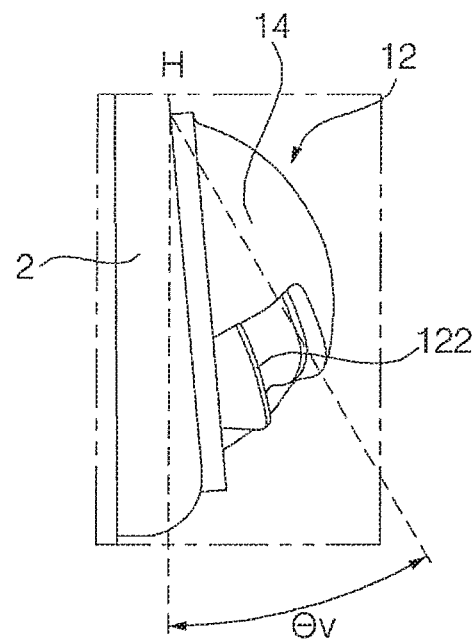
FIG. 10A shows a side view of the circulation nozzle and a nozzle cap assembly installed on the top cover.
Figure 10B:
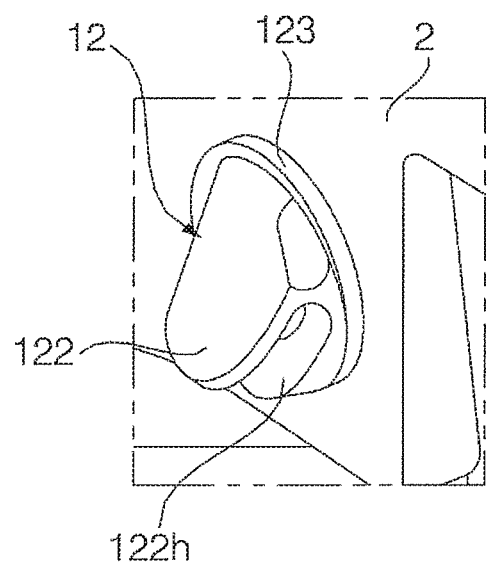
FIG. 10B is a perspective view showing a state in which the circulation nozzle has been installed on the top cover.
Figure 10C:
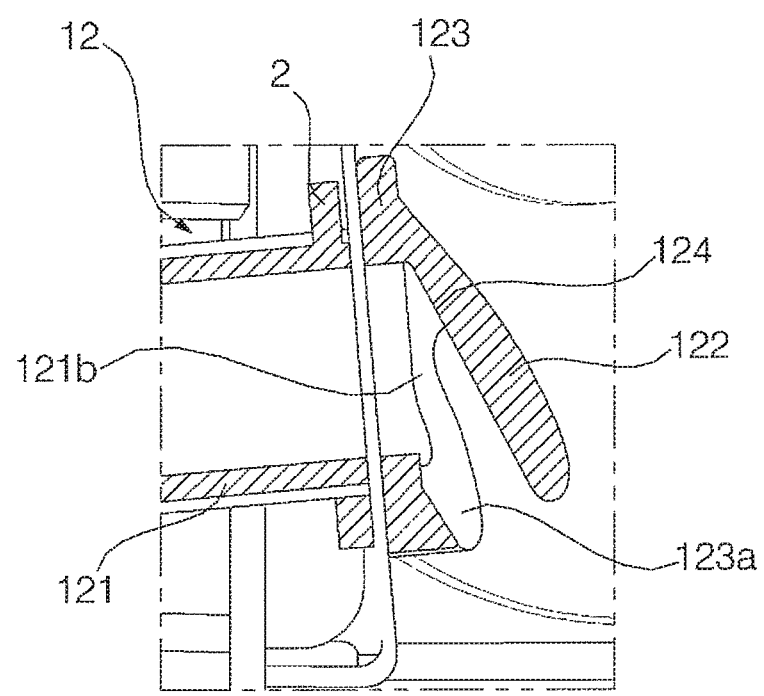
FIG. 10C is a side cross-sectional view of the circulation nozzle.

The direct water nozzle 13 may have substantially the same structure as the circulation nozzle 12. A nozzle mount 2a' on which the direct water nozzle 13 is to be installed may be formed in the top cover 2. The nozzle mount 2a' has substantially the same structure as the nozzle mount 2a, but as shown in FIG. 8, the first installation hole h1 and the second installation hole h2 may have a mirror symmetry form compared to the nozzle mount 2a.

A nozzle cap 14 may be coupled to each of the circulation nozzle 12 and the direct water nozzle 13. The nozzle cap 14 is configured to surround the diffuser 122 of each of the nozzles 12 and 13, and includes an opening part communicating with each of the spray holes of the nozzles 12 and 13. The nozzle cap 14 may be coupled to the plate 123.

Referring to FIG. 12, assuming that one side of a vertical plane to which the rotational axis c of the inner tub 5 belongs is a first region S1 and the other side thereof is a second region S2 based on a reference surface F extended in the front and rear direction, the circulation nozzle 12 may be provided in the first region S1 and may spray water so that it reaches the second region S2, and the direct water nozzle 13 may be provided in the second region S2 and may spray water so that it reaches the first region S1. That is, at least part of the spray hole of the circulation nozzle 12 may be open toward the second region S2, and at least part of the spray hole of the direct water nozzle 13 may be open toward the first region S1.

The inner tub 5 may include a bottom on which the pulsator 15 is provided and a cylindrical drum that extends upward from the bottom. The spray hole of the circulation nozzle 12 may be open toward a region that reaches from a first part P(S1) on the top of the pulsator 15 belonging to the first region S1 to a second part D(S2) on the inner circumferential surface of the drum belonging to the second region S2 in the state in which the inner tub 5 is an unloaded state.

The spray hole of the direct water nozzle 13 may be open toward a region that reaches from a third part P(S2) on the top of the pulsator 15 belonging to the second region S2 to a fourth part D(S1) on the inner circumferential surface of the drum belonging to the first region S1 in the state in which the inner tub 5 is an unloaded state.

Figure 13:
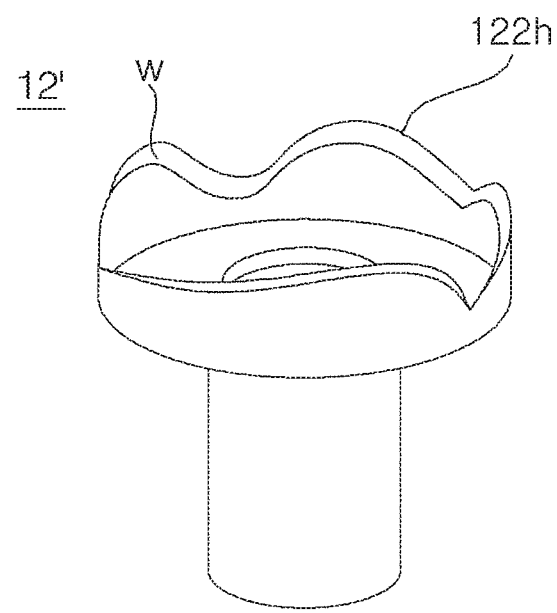
FIG. 13 shows a circulation nozzle according to another embodiment.

FIG. 13 shows a circulation nozzle according to another embodiment of the present disclosure. Referring to FIG. 13, the circulation nozzle 12' according to another embodiment of the present disclosure has the same configuration as the circulation nozzle 12 according to the previous embodiment except that part of the spray hole 122h forms a wave form W. In particular, the wave form W may be formed at the bottom of the collision surface 124 that forms the spray hole 122h.

Referring to FIGS. 14 to 17, the pump 100 may include a motor casing 130 configured to have the pump motor 170 received therein and a pump housing 140 configured to form the space in which the impeller 150 is received therein (hereinafter referred to as an "impeller reception space") and coupled to the motor casing 130. The impeller 150 may include a plurality of vanes 151 that are radially provided. Four vanes 151 may be provided, but the number of vanes is not necessarily limited thereto.

The pump housing 140 may include a housing main body 141 configured to form the impeller reception space, a supply port 142 forward extended from the housing main body 141 and configured to communicate with the impeller reception space, and two ports, that is, the circulation water discharge port 144 and the water discharge port 143 configured to discharge water, forcibly sent by the impeller 150, to the outside of the impeller reception space. The circulation water discharge port 144 and the water discharge port 143 may be outward extended from the housing main body 141.

The circulation water discharge port 144 may be formed to have substantially the same inside diameter as the water discharge port 143, but is not necessarily limited thereto. In some embodiments, the circulation water discharge port 144 may be formed to have a smaller inside diameter than the water discharge port 143.

The supply port 142 may be coupled to the water discharge bellows 18. The supply port 142 may be formed of a pipe extended in an axial direction in which the impeller 150 is rotated. Water discharged from the outer tub 6 to the water discharge bellows 18 may be supplied to the impeller reception space through the supply port 142.

A water discharge outlet 143a corresponding to an inlet of the water discharge port 143 and a circulation water outlet 144a corresponding to an inlet of the circulation water discharge port 144 may be formed on an inside surface 147 of a ring shape having a clearance between the pump housing 140 and the impeller 150. The inside surface 147 forms the inner circumferential surface of the housing main body 141. The water discharge outlet 143a and the circulation water outlet 144a may be spaced apart from at a specific interval in a circumferential direction thereof on the inside surface 147. The water discharge outlet 143a and the circulation water outlet 144a may be located in the range S between approximately 140 to 170 degrees around the shaft of the impeller 150. In this case, the range S is an angle formed by one end 144a1 of the circulation water outlet 144a and one end 143a1 of the water discharge outlet 143a around the shaft of the impeller 150 as in FIG. 15. Another end 144*a*2 of the circulation water outlet 144*a* and another end 143*a*2 of the water discharge outlet 143*a* may form an acute angle around the shaft of the impeller 150. An angle θp formed by the water discharge port 143 and the circulation water discharge port 144 may be approximately 30 to 90 degrees.

When the pump motor 170 is rotated forward, water may be supplied to the circulation hose 90 through the circulation water discharge port 144. When the pump motor 170 is rotated backward, water may be supplied to a water discharge hose or second hose 11 through the water discharge port 143. In order for water discharge and the circulation operation of water to be accurately performed, when water is discharged through the circulation water discharge port 144, it should not be discharged through the water discharge port 143. In contrast, when water is discharged through the water discharge port 143, it should not be prevented through the circulation water discharge port 144. To this end, when the impeller 150 is rotated forward, the circulation water outlet 144*a* is formed at a location higher than the water discharge outlet 143*a* on the upstream side of a water current. Accordingly, the water discharge outlet 143*a* Is located on the downstream side of a water current with respect to the circulation water outlet 144*a*.

The circulation water discharge port 144 and the water discharge port 143 are extended from the circulation water outlet 144*a* and the water discharge outlet 143*a*, respectively, to the outward direction of the housing main body 141, but the circulation water discharge port 144 is extended forward (or a first direction inclined toward the downstream side) with respect to the forward direction and the water discharge port 143 is extended backward (or a second direction inclined toward the upstream side) with respect to the forward direction.

Figure 14A:
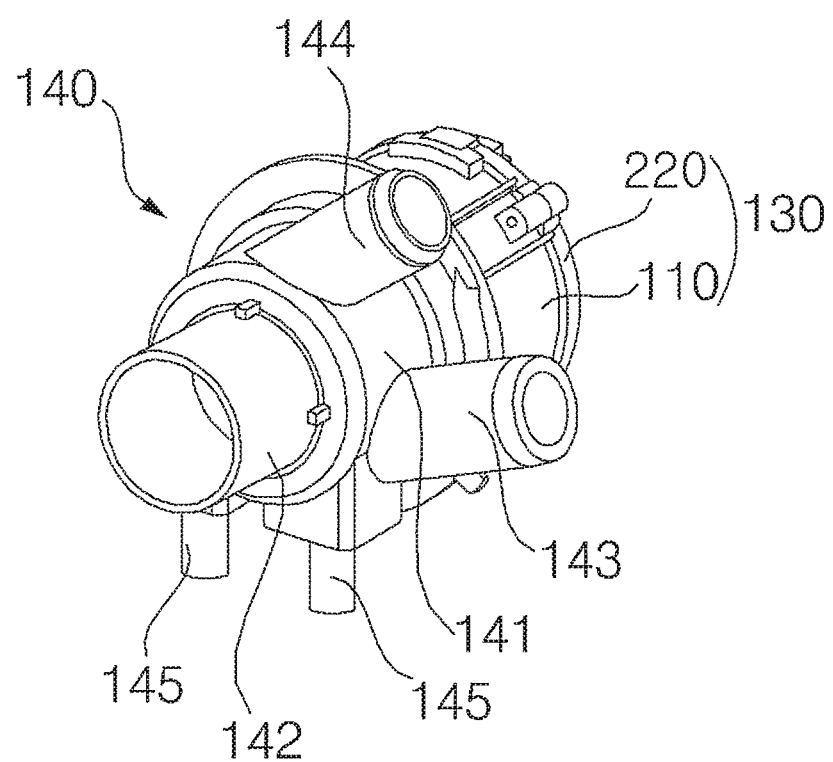
FIG. 14A is a perspective view of a pump according to an embodiment.
Figure 14B:
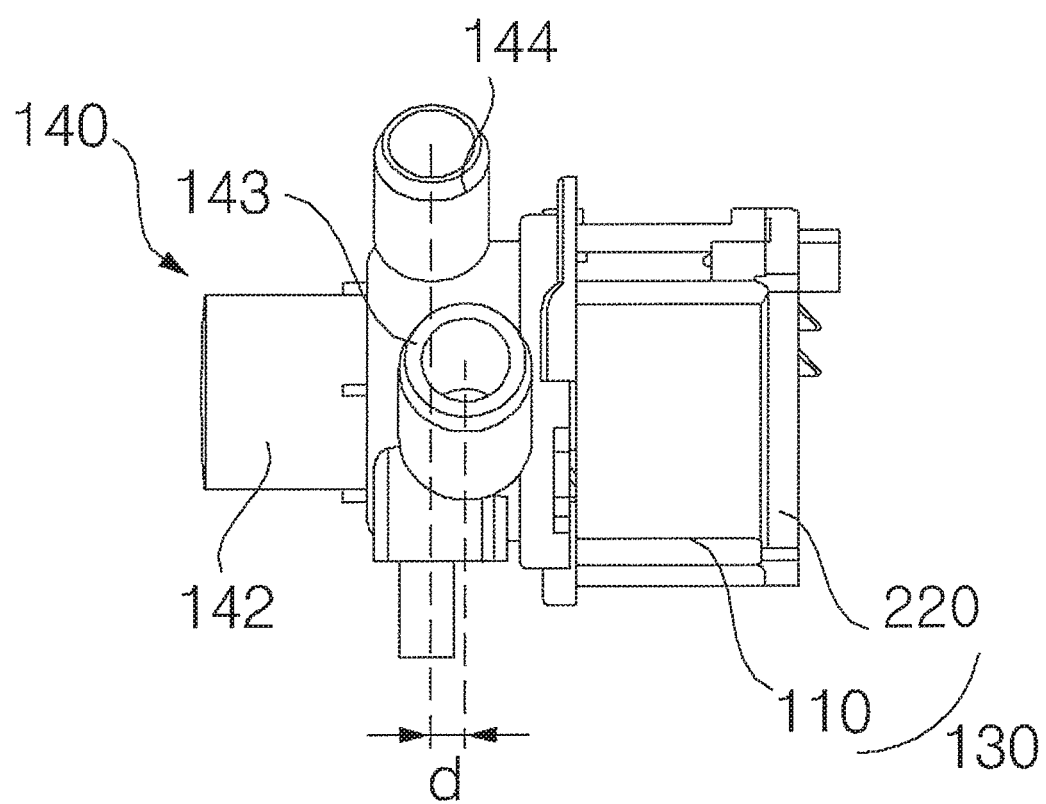
FIG. 14B is a side view of the pump.
Figure 14C:
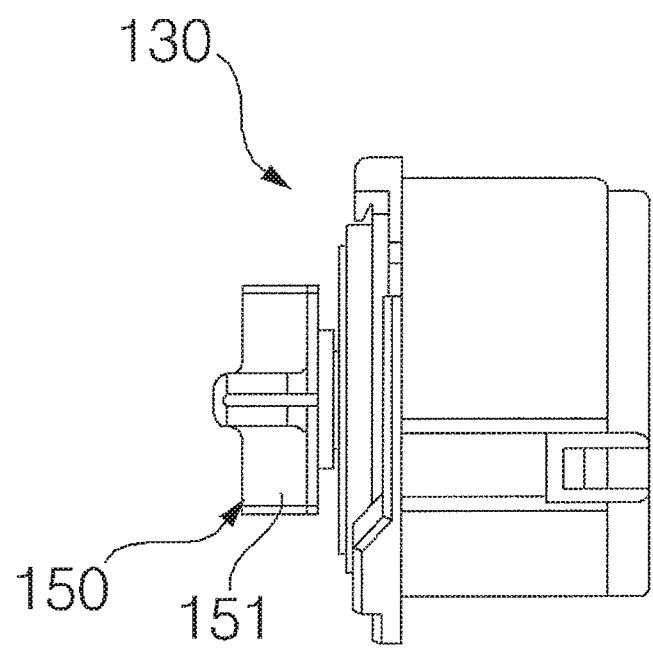
FIG. 14C shows a state in which a pump housing has been removed from the pump.
Figure 14D:
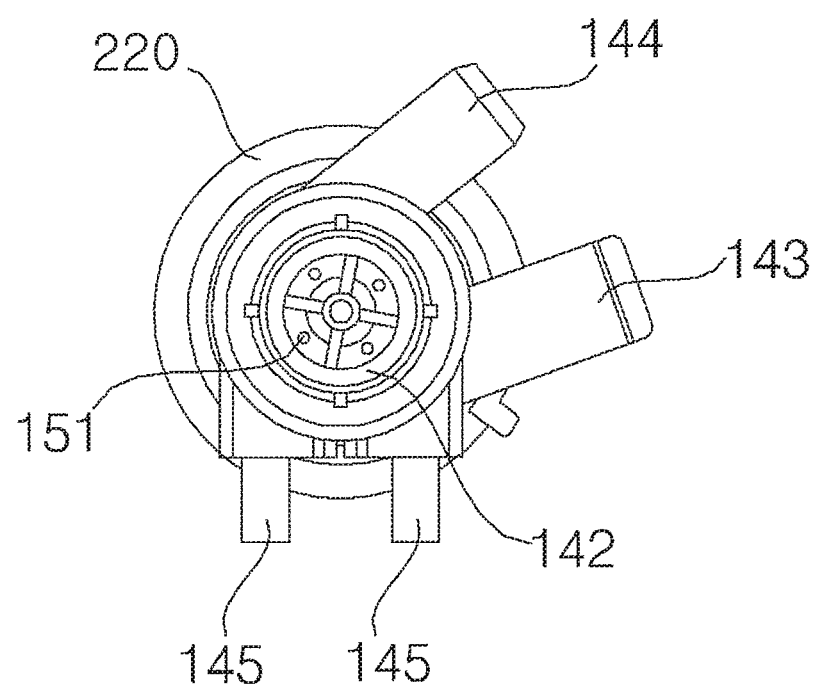
FIG. 14D is a front view of the pump.

As shown in FIG. 14B, when the pump 100 is viewed from the side, for example, along the shaft of the impeller 150, the center of the circulation water outlet 144*a* and the center of the water discharge outlet 143*a* may be spaced apart from each other at a specific interval "d" in the axial direction of the pump motor 170.

When the pump motor 170 is rotated forward, a water discharge prevention rib 146 for preventing water in the pump housing 140 from being discharged to the water discharge hose 11 through the water discharge outlet 143*a* may be protruded from the inside surface 147 of the pump housing 140. When the pump motor 170 is rotated backward, a circulation water discharge prevention rib 148 for preventing water in the pump housing 140 from being discharged to the circulation hose 90 through the circulation water outlet 144*a* may be protruded from the inside surface 147 of the pump housing 140.

Figure 15:
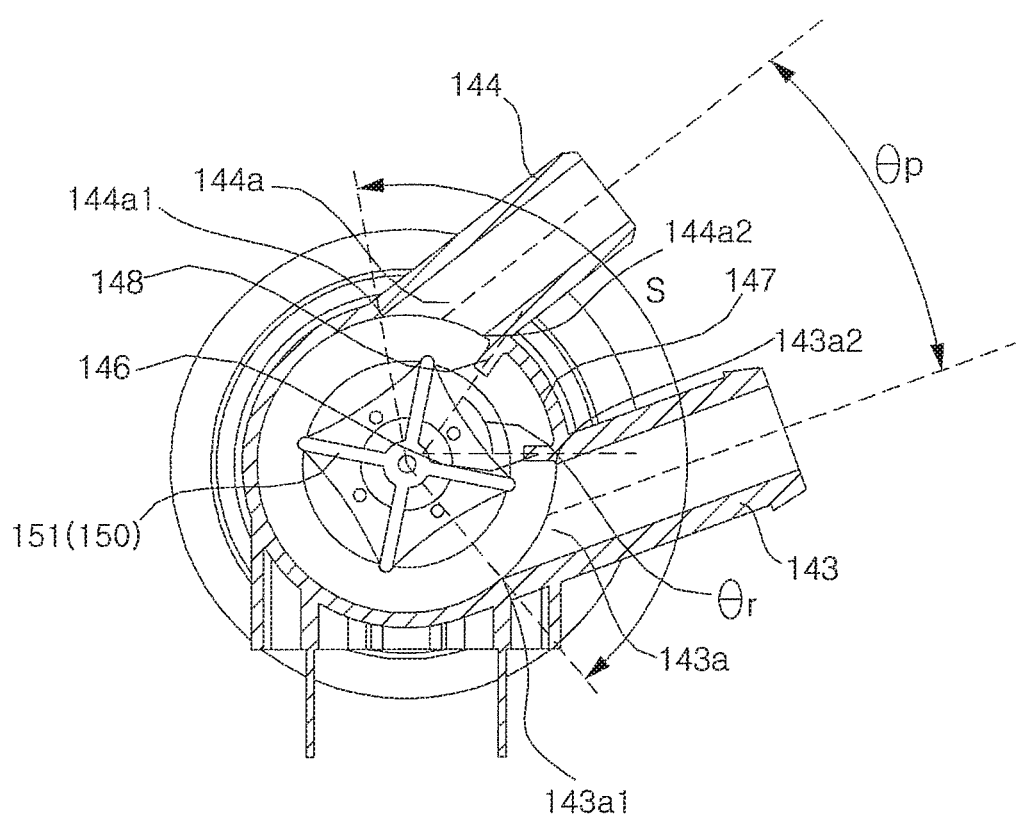
FIG. 15 shows a cut out view of an inside of the pump housing of the pump.
Figure 16:
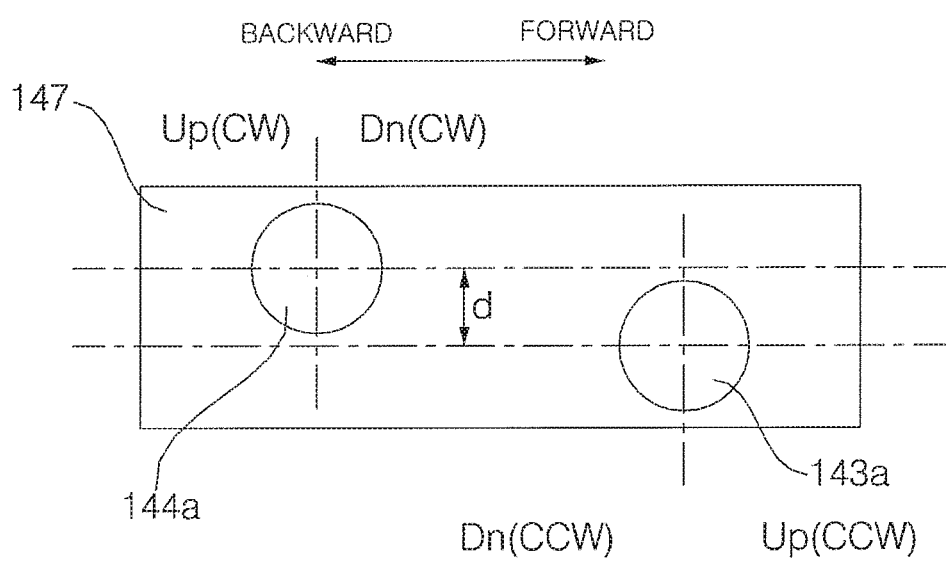
FIG. 16 shows an inside surface of the pump housing.
Figure 17A:
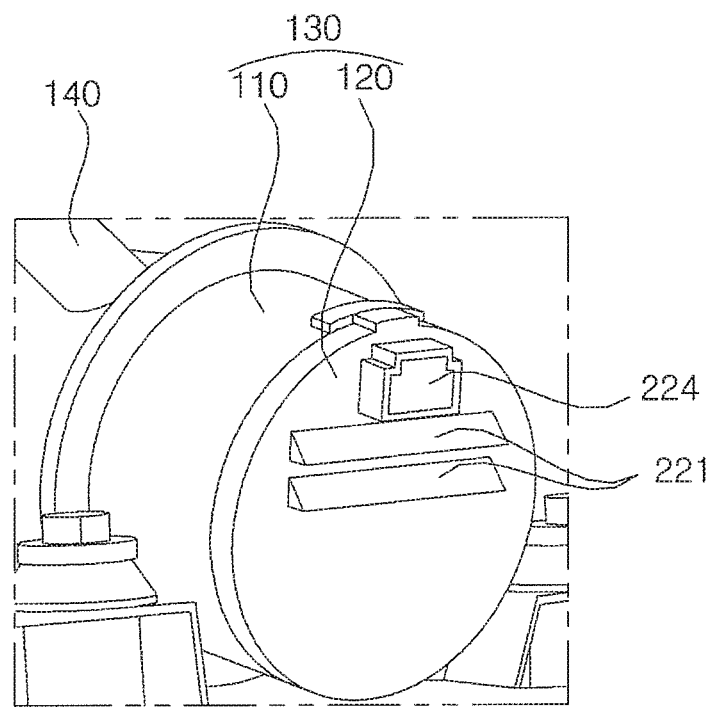
FIG. 17A shows a back part of the pump.
Figure 17B:
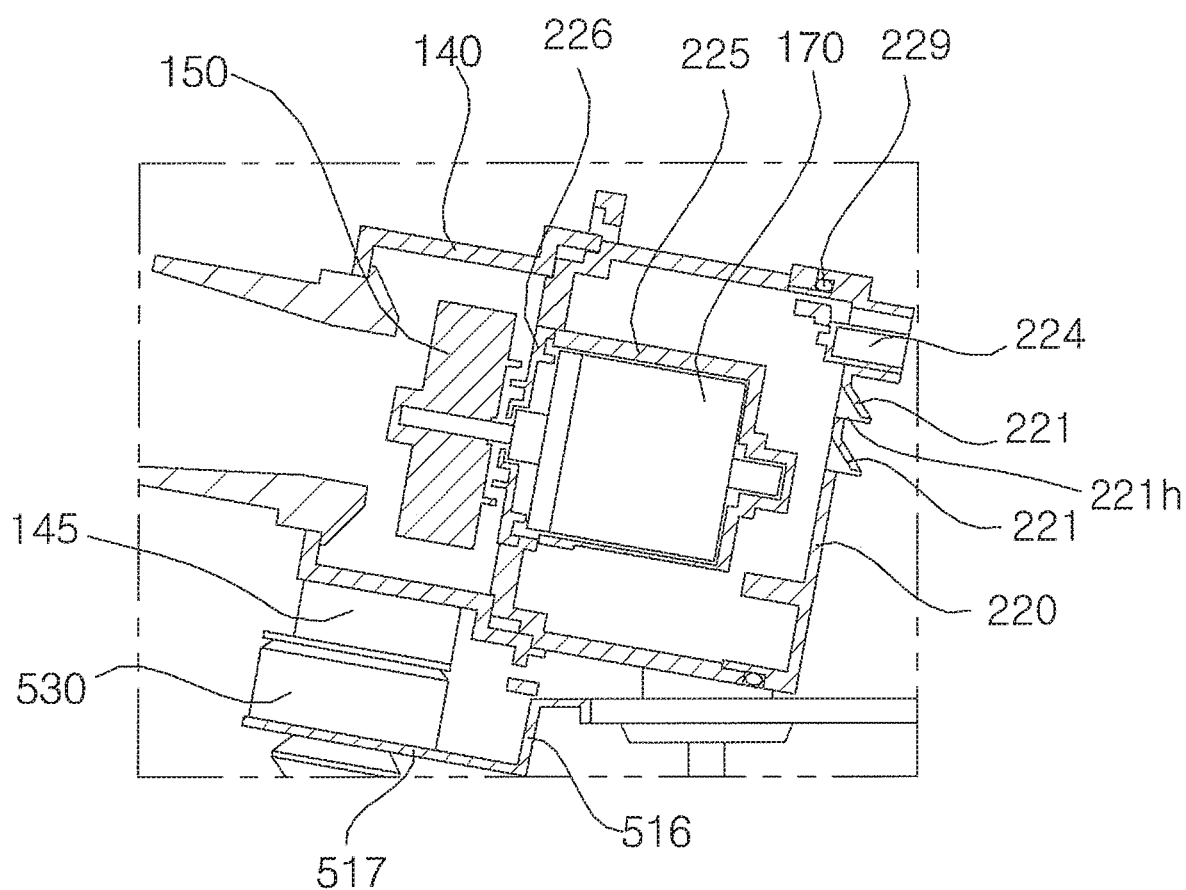
FIG. 17B is a side cross-sectional view of the pump.

FIG. 16 shows that the upstream side Up(CW) and downstream side Dn(CW) of the circulation water outlet 144*a* have been defined based on a water current when the pump motor 170 is rotated forward and the upstream side Up(CCW) and downstream side Dn(CCW) of the water discharge outlet 143*a* have been defined based on a water current when the pump motor 170 is rotated backward. In accordance with such a definition, in FIG. 15, the water discharge prevention rib 146 may be formed to be adjacent to the water discharge outlet 143*a* on the downstream side Dn(CCW), and the circulation water discharge prevention rib 148 may be formed to be adjacent to the circulation water outlet 144*a* on the downstream side Dn(CW).

The water discharge prevention rib 146 may be formed at the corner of the water discharge outlet 143*a*, and the circulation water discharge prevention rib 148 may be formed at the corner of the circulation water outlet 144*a*.

The water discharge prevention rib 146 and the circulation water discharge prevention rib 148 are formed within an interval between the impeller 150 and the inside surface 147 of the pump housing 140. The end of each of the ribs 146 and 148 maintains a specific interval from the vane 151 of the impeller 150. At least one of the water discharge prevention rib 146 and the circulation water discharge prevention rib 148 may be protruded in a length of approximately 3 to 6 mm from the inside surface 147 of the pump housing 140. Accordingly, the interval between the impeller 150 and the inside surface 147 may be greater than the protruded length.

For example, at least one of the water discharge prevention rib 146 and the circulation water discharge prevention rib 148 may form an acute angle along with the inside surface 147. In particular, an angle θr formed by the water discharge prevention rib 146 and the circulation water discharge prevention rib 148 may be 5 to 85 degrees. The water discharge prevention rib 146 and the circulation water discharge prevention rib 148 may be vertically protruded from the inside surface 147 and an angle formed by both the ribs 146 and 148 may be 40 degrees. If both the ribs 146 and 148 and the inside surface 147 form an oblique angle and an angle formed by both the ribs 146 and 148 is 80 degrees as shown in FIG. 15, the amount of water that leaks to the circulation water discharge port 144/water discharge port 143 upon water discharge/circulation is reduced.

The motor casing 130 may be coupled to the pump housing 140. The pump housing 140 has an opening part formed on the side opposite the side of the supply port 142, and the motor casing 130 is coupled to the pump housing 140. Accordingly, the opening part can be shielded. A ring-shaped sealer 129 may be interposed along the coupling part of the motor casing 130 and the pump housing 140.

The motor casing 130 may include a casing body 110 and a rear cover 220. A motor housing 225 in which the pump motor 170 is received may be provided on the inside of the casing body 110. The motor casing 130 may have a cylindrical shape backward extended from a front part 226 through which the shaft of the motor 170 passes. The open rear end part of the motor housing 225 may be coupled to the rear cover 220. The front part of the motor housing 225 may be open so that the pump motor 170 is inserted into the motor housing 225. The open portion of the motor housing 225 may be coupled to the front part 226 of the casing body 110.

One or more heat dissipation hole 221*h* may be formed in the rear cover 220. A shield plate 221 for blocking dropping water from entering the heat dissipation hole 221*h* may be formed above the heat dissipation hole 221*h*. The shield plate 221 may be inclined downward. Furthermore, a power connector 224 for connecting the pump motor 170 and a power line may be formed in the rear cover 220.

Figure 18:
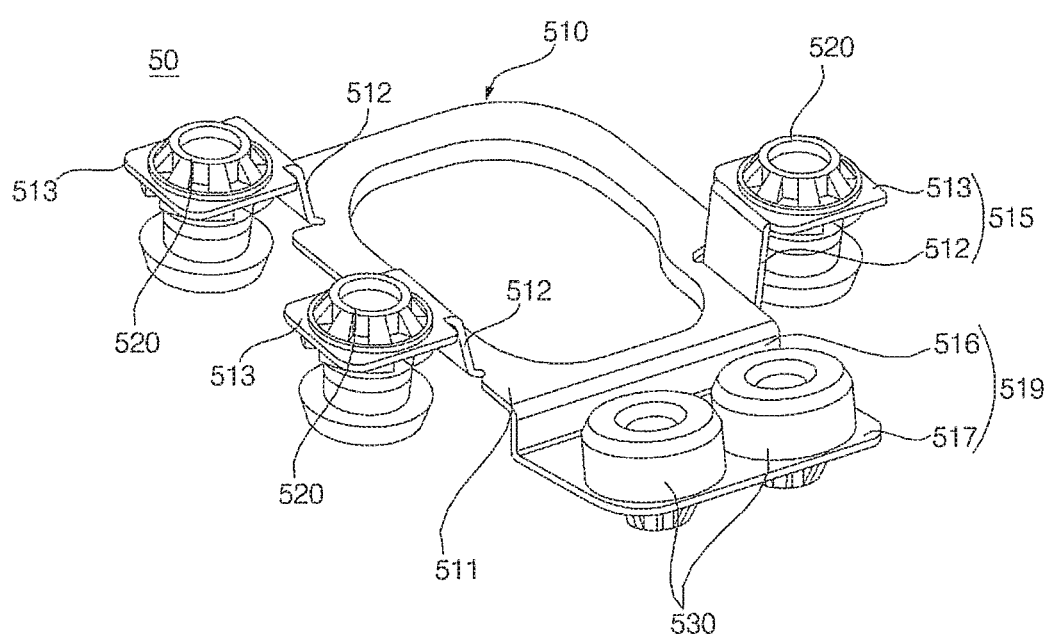
FIG. 18 is a perspective view of a pump bracket.
Figure 19:
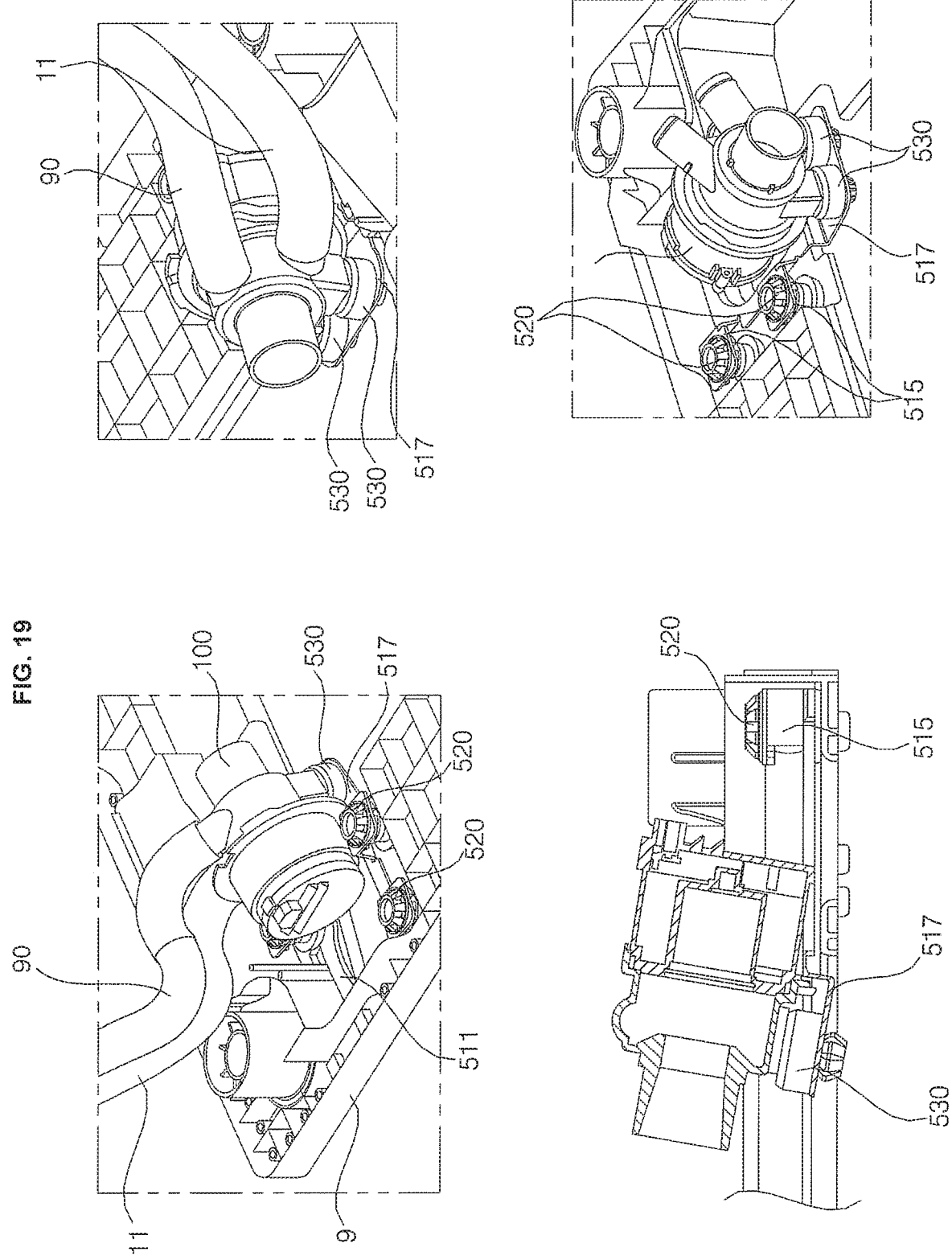
FIG. 19 shows a state in which the pump has been installed on a base in various aspects.

FIG. 18 is a perspective view of a pump bracket. FIG. 19 shows the state in which the pump has been installed on the base in various aspects. Referring to FIGS. 18 and 19, the pump 100 may be coupled to the base 9 by a pump supporter 50. The pump supporter 50 may include a plate 510 made of metal, plate support dampers 520 installed on the plate 510, and pump support dampers 530 provided in the plate 510 and configured to support legs 145 formed in the pump 100. Three plate support dampers 520 may be provided in a triangular structure.

The plate support dampers 520 and/or the pump support dampers 530 may be made of an elastic material, for example, rubber. Accordingly, vibration caused when the pump 100 is driven can be absorbed by the dampers 520 and 530. The plate 510 may include a horizontal flat part or section 511, a plate support damper mount 515 upward extended from the flat part 511, and a pump support damper mount 519 downward extended from the flat part 511.

The plate support damper mount 515 may include an upper vertical unit or section 512 upward curved from the flat part 511 and an upper horizontal unit or section 513 horizontally curved from the upper vertical unit 512 to the outside of the flat part 511 and configured to have a hole in which the plate support dampers 520 is provided formed in. The plate support damper 520 has its lower part coupled to the base 9 in the state in which they have been fixed on the upper horizontal unit 513.

The pump support damper mount 519 may include a lower vertical part or section 516 downward curved from the flat part 511 and a lower horizontal part or section 517 horizontally curved from the lower vertical part 516 to the outside or outer edge of the flat part 511 and configured to have a hole in which the pump support damper 530 is provided formed therein.

The pump 100 may include the pair of legs 145 downward protruded from the pump housing 140. The pump support dampers 530 have their upper parts coupled to the legs 145 of the pump 100 in the state in which they have been fixed on the lower horizontal part 517.

Figure 20:
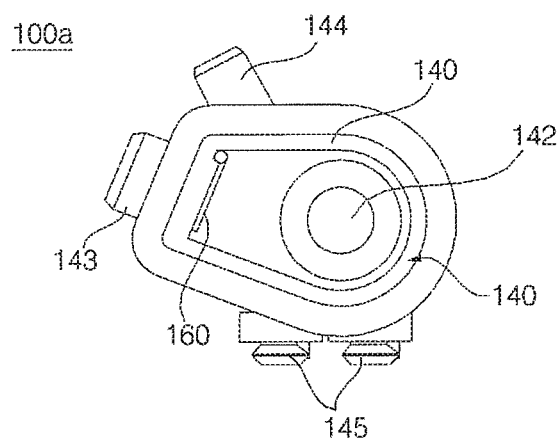
FIG. 20 shows a pump according to another embodiment.
Figure 20:
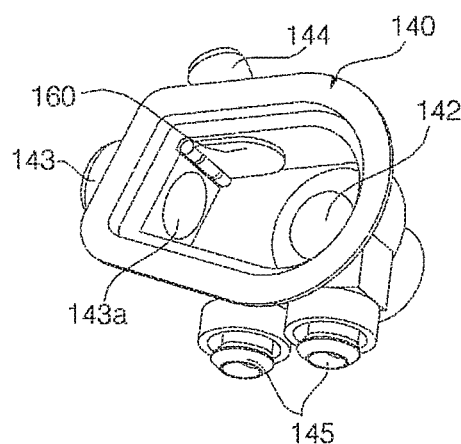
Figure 20:
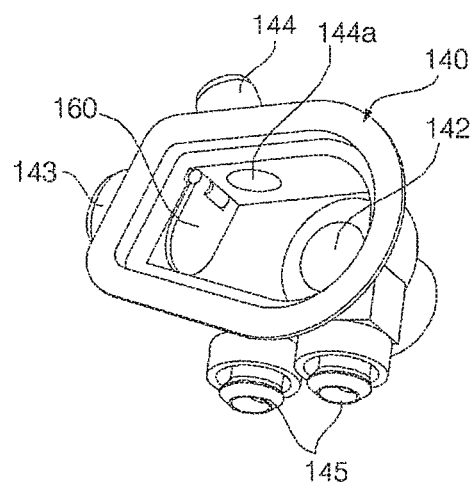

FIG. 20 shows a pump 100a according to another embodiment. Hereinafter, same reference numerals may be assigned to the same elements as those of aforementioned embodiments, and a description of the elements may be omitted.

Referring to FIG. 20, the pump 100a may include a check valve 160 rotatably connected to the inside surface 147 of the pump housing 140 and configured to shut the water discharge outlet 143a when the pump motor 170 is rotated forward and to shut the circulation water outlet 144a when the pump motor 170 is rotated backward.

The check valve 160 is driven by a water current formed by the impeller 150. The check valve 160 may have its shaft, connected to the inside surface 147 of the pump housing 140, formed substantially parallel to the shaft of the impeller 160. The shaft of the pump housing 140 may be located between the circulation water outlet 144a and the water discharge outlet 143a. Accordingly, the rotation direction of the impeller 160 becomes opposite that of the check valve 160. When the impeller 160 is rotated forward, the water discharge outlet 143a is located on the downstream side of a water current compared to the circulation water outlet 143a. Accordingly, when the impeller 160 is rotated forward, the water discharge outlet 143a maintains a shutting state by the check valve 160. In this state, when the rotation direction of the impeller 160 is reversed, the check valve 160 is rotated forward, the water discharge outlet 143a is open, and the circulation water outlet 144a is open.

The check valve 160 may be made of a soft material, for example, rubber, having some elasticity. A surface that belongs to the check valve 160 and that comes into contact with the inside surface 147 of the pump housing 140 may be formed flat. Peripheral portions of the circulation water outlet 144a and the water discharge outlet 143a, which come into contact with the check valve 160, in the inside surface 147 of the pump housing 140 may be formed flat. Unwanted leakage from the pump 100a can be prevented because the check valve 160 shuts the water discharge outlet 143a or the circulation water outlet 143a in response to the rotation direction of the pump motor 170.

Figure 21A:
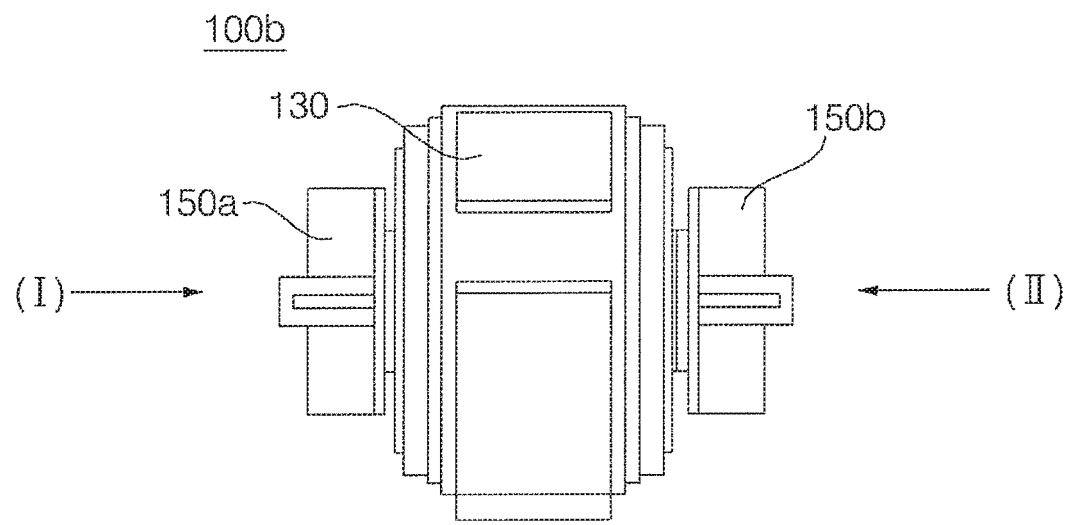
FIG. 21A shows a pump in a state in which a first pump housing and a second pump housing have been removed.

FIG. 21A shows a pump 100b according to yet another embodiment in which a first pump housing 140a and a second pump housing 140b have been removed. Hereinafter, the same reference numerals are assigned to the same elements as those of the aforementioned embodiments, and a description of the elements may be omitted.

Figure 21B:
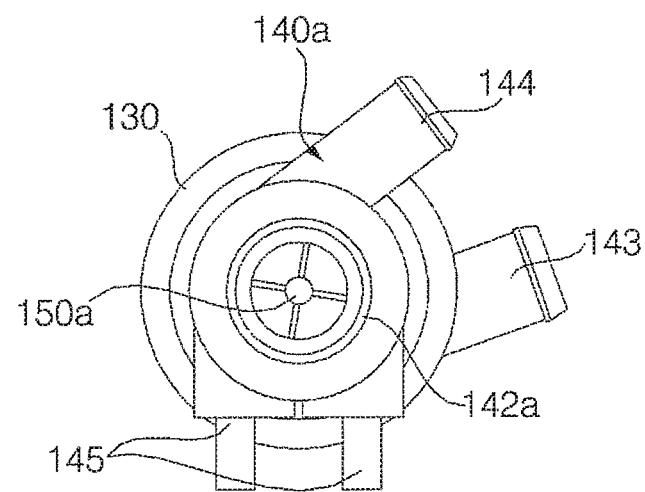
FIG. 21B shows the pump viewed in a direction I indicated in FIG. 21A in a state in which the first pump housing and the second pump housing have been assembled.
Figure 21C:
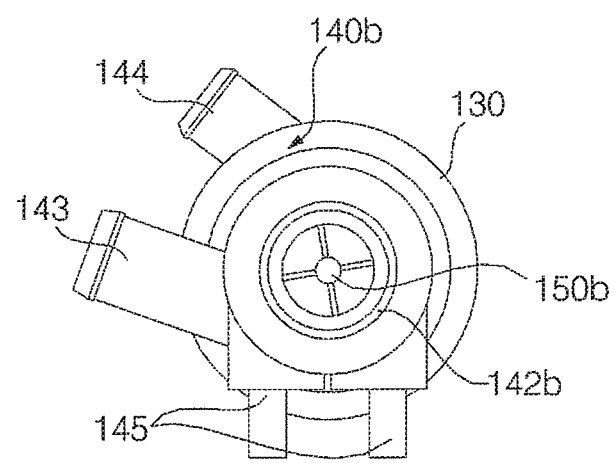
FIG. 21C shows the pump viewed in a direction II indicated in FIG. 21A in the state in which the first pump housing and the second pump housing have been assembled.
Figure 22A:
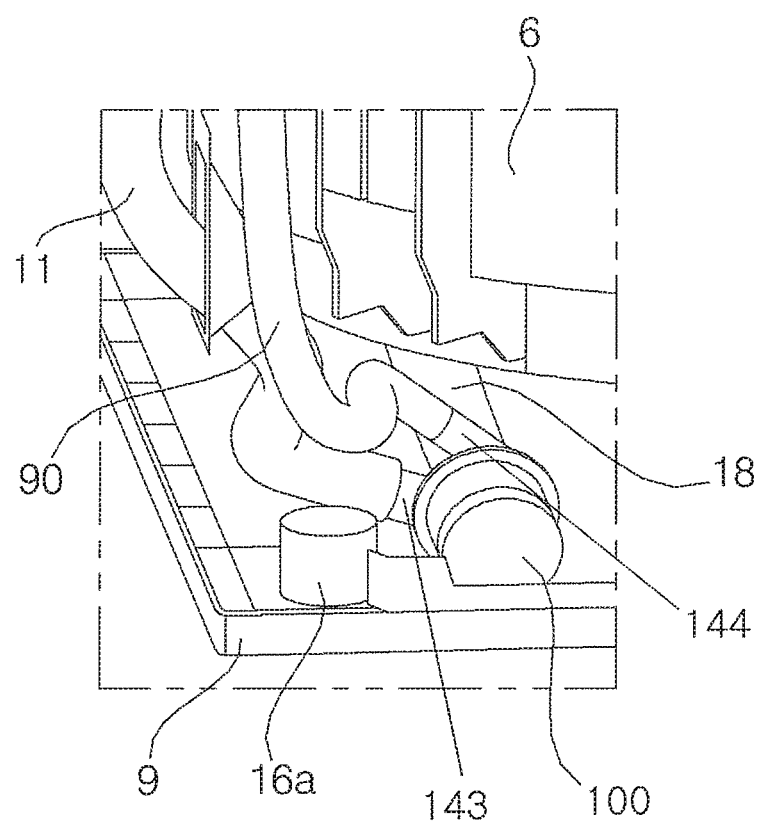
FIGS. 22A and 22B are partial perspective views showing a relation between a lower part of a circulation hose and surrounding elements of FIG. 2.
Figure 22B:
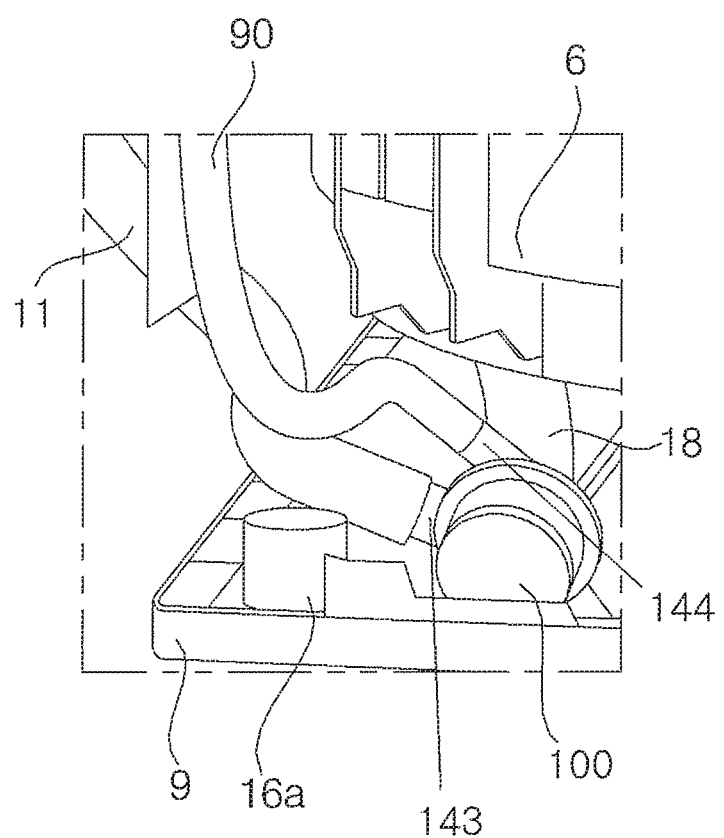
Figure 23:
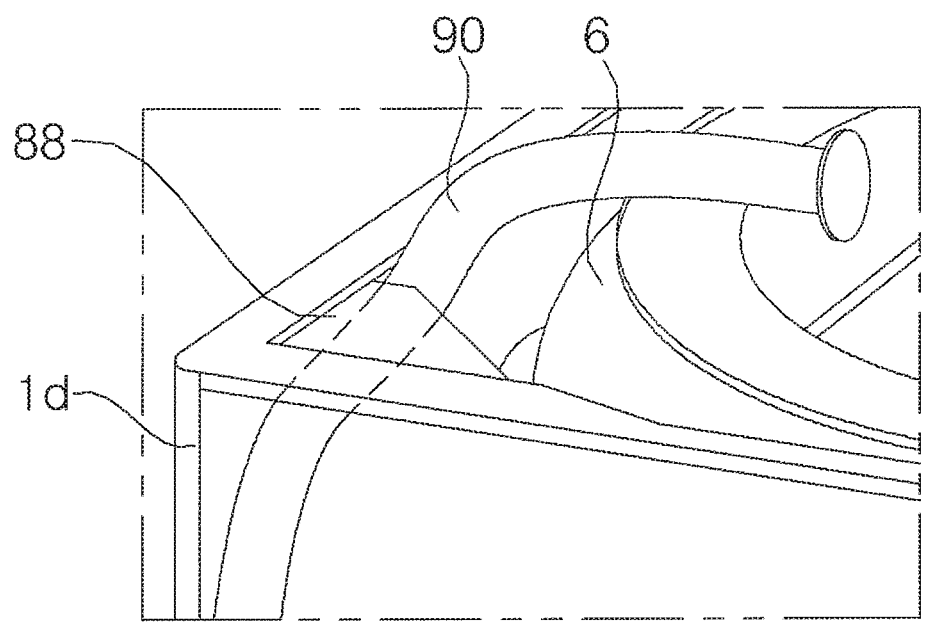
FIG. 23 is a perspective view showing a relation between an upper part of the circulation hose and surrounding elements of FIG. 2.
Figure 24:
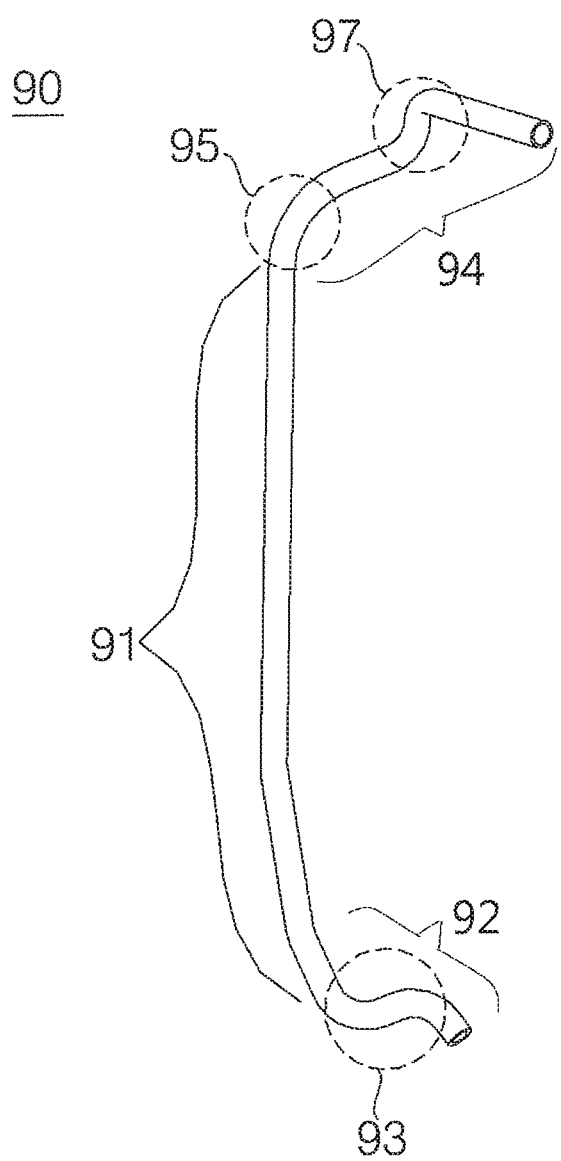
FIG. 24 is a perspective view of the circulation hose of FIG. 2.

Referring to FIG. 21, the pump 100b includes a pump motor of a biaxial motor. Impellers 150a and 150b may be coupled to both shafts of the biaxial motor. The biaxial motor is a two-shaft motor. The shafts are aligned on the same line and rotated by a common rotator. The pump 100b may include the first pump housing 140a and the second pump housing 140b for receiving the first impeller 150a and the second impeller 150b, respectively. The first pump housing 140a and the second pump housing 140b may be coupled to both sides of the pump casing 130.

Supply ports 142a and 142b may be formed in at least one of the first pump housing 140a and the second pump housing 140b. In an embodiment, the first supply port 142a and the second supply port 142b have been illustrated as being formed in the first pump housing 140a and the second pump housing 140b, respectively, and thus water supplied through the water discharge bellows 18 is supplied to the first supply port 142 and the second supply port 142b. However, the present embodiment is not limited to such a configuration. For example, the first pump housing 140a and the second pump housing 140b may be configured to communicate with each other so that water can be supplied to both the pump housings 140a and 140b through a single supply port.

The circulation water discharge port 144 may be formed in the first pump housing 140a, and the water discharge port 143 may be formed in the second pump housing 140b. The present embodiment has substantially the same configuration as the previous embodiment except that the circulation water discharge port 144 and the water discharge port 143 are not formed in a single common pump housing, but are formed in the first pump housing 140a and the second pump housing 140b.

The water discharge port 143 may not be formed in the first pump housing 140a, and the circulation water discharge port 144 may not be formed in the second pump housing 140b. When the pump motor is rotated forward, water forcibly sent by the first impeller 150a is discharged through the circulation water discharge port 144. When the pump motor is rotated backward, water forcibly sent by the second impeller 150b may be discharged through the water discharge port 143.

Referring to FIGS. 22A to 24, the circulation hose 90 may be provided in the cabinet 1. The circulation hose 90 may be provided near the inside corner of the cabinet 1. The circulation hose 90 may be provided near an inside corner that belongs to the inside corners of the cabinet 1 and that is located at the back.

The circulation hose 90 may include an upward extension part 91 that is upward extended. Water pumped by the pump 100 flows from the bottom to the top of the upward extension part 91. In the present embodiment, the upward extension part 91 is upward extended up to the lower side of the hanger bracket 88 fixed to the inside of an corner formed by the side part 1c and the backside unit 1d (refer to FIGS. 2 and 3).

The upward extension part 91 may be located near the corner of the cabinet 1. The pump 100 may be provided on one side under the cabinet 1. In this case, the upward extension part 91 may be provided near an inside corner that belongs to the inside corners of the cabinet 1 and that is located at the back on the one side. Alternatively, the upward extension part 91 may be provided on the same side as the circulation nozzle 12 based on the dispenser 17.

The circulation hose 90 may include a pump connection part 92 for connecting the pump 100 and the bottom of the upward extension part 91 and a nozzle connection part 94 for connecting the top of the upward extension part 91 and the circulation nozzle 12. The shape of the pump connection part 92 is described below based on a flow direction of water. The pump connection part 92 may be formed so that it is backward extended from the pump 100, roundly curved and horizontally extended in any one of both lateral directions, upward roundly curved, and connected to the bottom of the upward extension part 91.

The lateral direction refers to the direction toward any one of the two side parts 1b and 1c. In particular, a portion that belongs to the pump connection part 92 and that is backward extended from the pump 100 may be upward inclined. The pump connection part 92 may be formed in such a way as to be backward extended from the pump 100 so that it forms an upward inclination, roundly curved in the direction of an inside corner that belongs to the inside corners of the cabinet 1 and that is close to the pump connection part 92, substantially horizontally extended, upward curved roundly, and then connected to the bottom of the upward extension part 91.

In an embodiment in which the upward extension part 91 is provided in any one of the inside corners of the cabinet 1, the pump connection part 92 may be formed in such a way as to be backward extended from the pump 100 so that it forms an upward inclination, roundly curved in the direction of an inside corner in which the upward extension part 91 is provided, horizontally extended, upward roundly curved, and then connected to the bottom of the curved the upward extension part 91.

The shape of the nozzle connection part 94 is described below based on a flow direction of water. The nozzle connection part 94 may be formed in such a way as to be roundly curved from the top of the upward extension part 91 in the other one of both directions, horizontally extended, upward extended and roundly curved, forward rounded and curved, and then connected to the circulation nozzle 12. The other one of both directions refers to the remaining one direction different from the direction in which the pump connection part 92 is curved.

The nozzle connection part 94 may be formed in such a way as to be roundly curved from the top of the upward extension part 91 in the direction opposite the direction of an inside corner that belongs to the inside corners of the cabinet 1 and that is close to the nozzle connection part 94, horizontally extended, upward extended and roundly curved, forward rounded and curved, and then connected to the circulation nozzle 12.

In an embodiment in which the upward extension part 91 is provided in any one of the inside corners of the cabinet 1, the upward extension part 91 may be formed in such a way as to be roundly curved in the direction opposite the direction of the inside corner in which the upward extension part 91 is provided, horizontally extended, upward extended and roundly curved, forward rounded and curved, and then connected to the circulation nozzle 12.

The characteristics of the circulation hose 90 are described below based on a provided relation between surrounding elements. The circulation hose 90 may include a first curved part 93 which is connected to the circulation water discharge port 144, at least one roundly curved from the protrusion direction of the circulation water discharge port 144 to the direction of the corner in which the upward extension part 91 is provided, and at least one roundly curved upward from the direction of the corner so that it is connected to the bottom of the upward extension part 91.

The circulation hose 90 may include a second curved part 95 which is connected to the top of the upward extension part 91 and at least one roundly curved in the direction that becomes close to the circulation nozzle 12. The second curved part 95 is roundly curved in the horizontal direction along the inside surface of any one of the front part 1a, the two side parts 1b and 1c, and the backside unit 1d, and is extended to become closer to the circulation nozzle 12. In the present embodiment, the second curved part 95 is roundly curved from the hanger bracket 88 along the backside unit 1d in the horizontal direction and then extended up to a portion adjacent to the backside unit 1d at the back of the circulation nozzle 12.

The circulation hose 90 may include a third curved part 97 which is at least one roundly curved upward from the downstream side of the second curved part 95, extended up to the height of the circulation nozzle 12, and then at least one roundly curved in the direction of the circulation nozzle 12 so that it is connected to the circulation nozzle 12. The entire circulation hose 90 may be made of the same material or both end parts 90a and 90c and a section 90b between the two end parts may be made of different materials. In an embodiment, the entire circulation hose 90 may be made of a rubber material, such as ethylenepropylene (EPDM).

Figure 25:
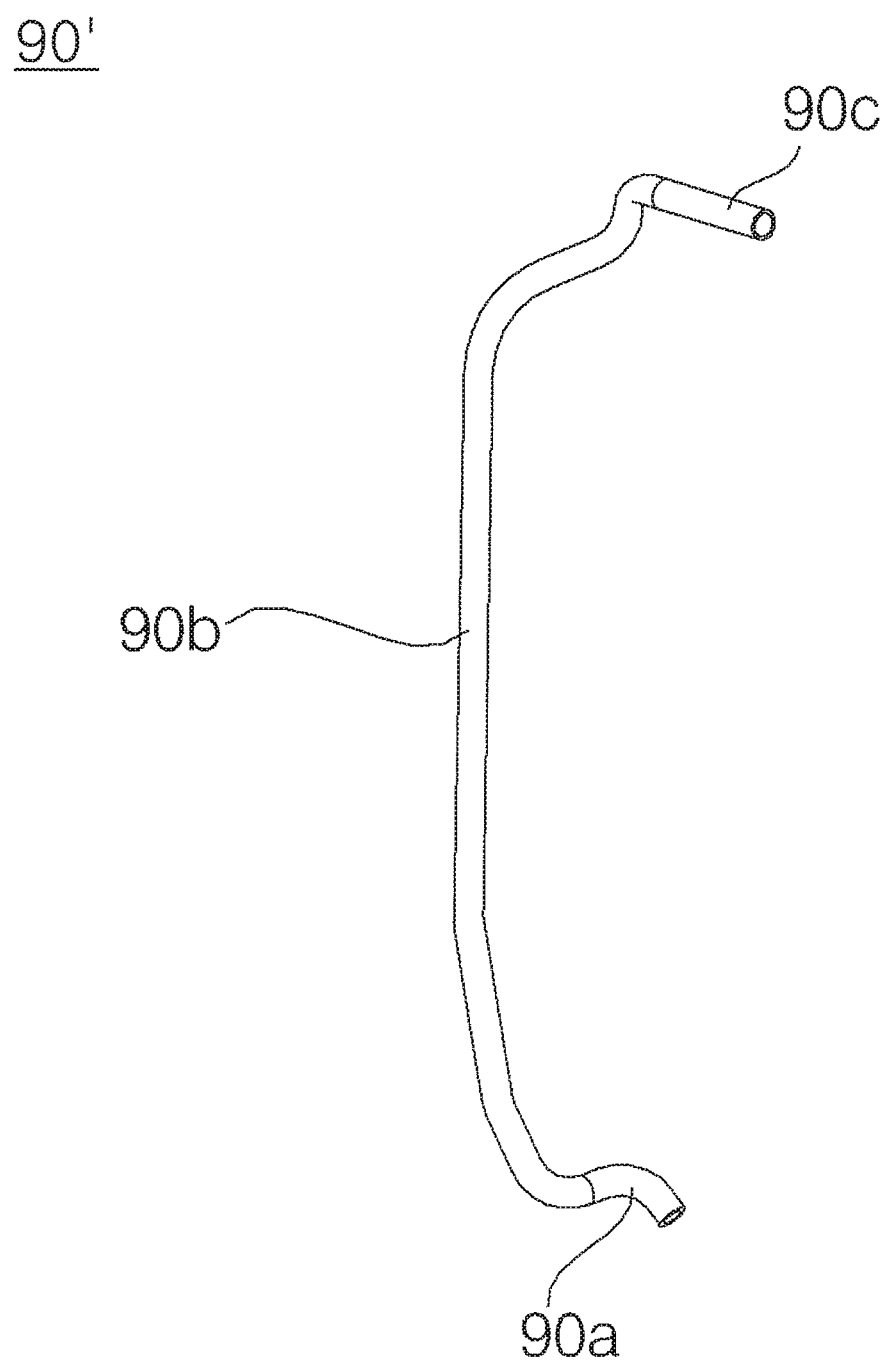
FIG. 25 is a perspective view of a circulation hose according to another embodiment.

Referring to FIG. 25, the circulation hose may include first and second end parts 90a and 90c and a section 90b between the first end part 90a and the second end part 90c. The first and the second end parts 90a and 90c may be made of a soft material. The section 90b may be made of a material harder than that of the first and the second end parts 90a and 90c. The first end part 90a and/or the second end part 90c may be made of a rubber material. The section 90b may be made of a material harder than the rubber material, for example, polypropylene (PP).

The section 90b is made of a hard material as described above. Accordingly, although water fluctuates through the circulation hose 90' when the pump 100 operates, the section 90b is not easily deformed and maintains its location. As a result, a possibility that the section 90b may come into contact with the inside surface of the cabinet 1 or the outer tub 6 is poor. The first end part 90a and the second end part 90c coupled to the pump 100 and the circulation nozzle 12, respectively, are made of a soft material. Accordingly, the vibration of the pump 100 or vibration delivered in a spray process through the circulation nozzle 12 can be less delivered to the section 90b.

The hose part of the circulation hose 90 made of the EPDM material may have a pipe or hose thickness of 3 mm, an inside diameter of 18 mm, and an outside diameter of 24 mm. The hose part of the circulation hose 90 made of the PP material may have a pipe thickness of 2.5 mm, an inside diameter of 20 mm, and an outside diameter of 25 mm. The circulation hose 90 may be attached to the outer tub 6. If the outer tub 6 and the circulation hose 90 are strongly coupled, a danger that a connection between the outer tub 6 and the circulation hose 90 may be broken can be reduced.

In a first embodiment, the upward extension part 91 may be provided to be upward extended while coming into contact with the outer tub 6, and may include a fixing part (not shown) for fixing the upward extension part 91 and the outer tub 6 to a specific location of the outer tub 6. The pump connection part 92 or the first curved part 93 may be attached to the outer tub 6. A fixing part for fixing the pump connection part 92 or the first curved part 93 and the outer tub 6 may be provided. Furthermore, the nozzle connection part 94, the second curved part 95 or the third curved part 97 may be attached to the outer tub 6. A fixing part for fixing the nozzle connection part 94, the second curved part 95 or the third curved part 97 and the outer tub 6 may be provided.

In a second embodiment, the circulation hose 90 may be provided to be spaced apart from the outer tub 6. When the inner tub 5 is rotated, the outer tub 6 is vibrated, and a surface of the vibrated outer tub 6 does not come into contact with a surface of the circulation hose 90. Accordingly, a danger that the circulation hose 90 may be broken can be reduced, and noise attributable to a touch can be reduced.

In the second embodiment, the washing machine may include a first fixing part 71 spaced apart from the top of the base 9 upward at an interval of 280 mm and provided on the inside surface of the backside unit 1d. The first fixing part 71 may fix the upward extension part 91 to the backside unit 1d or the side parts 1b and 1c. The washing machine may include a second fixing part 72 spaced apart from the first fixing part 71 upward at an interval of 260 mm and provided on the inside surface of the backside unit 1d. The second fixing part 72 may fix the upward extension part 91 to the backside unit 1d or the side parts 1b and 1c. Accordingly, a load of the upward extension part 91 can be equally distributed, and the upward extension part 91 is fixed to the cabinet 1. In the present description, 280 mm and 260 mm are meant to include a tolerance permitted to a person having ordinary skill in the art.

In the second embodiment, the washing machine may include a third fixing part 73 provided on the inside surface of the top cover 2a and configured to fix the circulation hose 90 to the top cover 2a on the downstream side of the third curved part 97. Accordingly, weight of the circulation hose 90 is supported even on the upper side, and the circulation hose 90 can be spaced apart from the upper side of the outer tub 6.

A washing machine according to an embodiment may have advantages such as a simpler structure and a reduced manufacturing cost because both circulation and discharge of washing water may be implemented using a single pump. The circulation and discharge of washing water may be selectively performed by changing only a rotation direction of the pump without a separate valve. Furthermore, there is an advantage in that the circulation and discharge of washing water operation may be performed more accurately by improving a structure of the circulation water discharge port and water discharge port of a pump.

Leakage of water through the water discharge port of the pump may be prevented when washing water is circulated, and leakage of water through the circulation water discharge port may be prevented when water is discharged.

Clothes or laundry exposed to air within the inner tub may be effectively dampened because a spray angle of the circulation nozzle may be changed. Washing variation according to a clothes amount may be reduced because a spray angle of the circulation nozzle is changed based on a clothes amount during washing. An amount of water used for washing may be reduced and clothes may be uniformly dampened.

A change of color generated because clothes or laundry are exposed to air or a secondary contamination attributable to congealing of detergent dregs may be prevented because water may be supplied to clothes exposed to air using the circulation nozzle.

Embodiments disclosed herein provide a washing machine that may be capable of implementing both circulation and discharge of washing water using a single pump. A washing machine using a bidirectional pump may be capable of changing a rotation direction so as to implement the circulation and discharge of washing water. A washing machine may be capable of selectively performing the circulation and discharge of washing water by changing only the rotation direction of the pump without a separate valve. A washing machine in which the circulation and discharge operation of washing water is performed more accurately is provided that may improve the structure of the circulation water discharge port and water discharge port of a pump. A washing machine may be capable of preventing the leakage of water through the water discharge port of the pump when washing water is circulated and preventing the leakage of water through the circulation water discharge port when water is discharged.

According to embodiments disclosed herein, a washing machine may include a flat base, a cabinet supported by the base, an outer tub provided within the cabinet and configured to contain water, an inner tub configured to accommodate clothes and to rotate around a vertical axis within the outer tub, a circulation nozzle configured to spray water into the inner tub, a circulation hose configured to have one end coupled to the circulation nozzle, a water discharge hose configured to discharge water discharged from the outer tub to the outside of the washing machine, and a pump provided in the base and configured to selectively supply the circulation hose and the water discharge hose with water discharged from the outer tub. The pump includes a pump motor configured to rotate forward and backward, an impeller configured to be rotated by the pump motor, and a pump housing configured to form a space in which the impeller is accommodated and to include a supply port into which water discharged from the outer tub is introduced, a circulation water discharge port coupled to the other end of the circulation hose, and a water discharge port coupled to the water discharge hose. The pump housing includes a water discharge outlet and a circulation water outlet formed in a cylindrical direction in such a way as to be spaced apart from each other on a ring-shaped inside surface forming a clearance between the pump housing and the impeller. The circulation water outlet is formed on an upstream side higher than the water discharge outlet based on a water current generated when the impeller is rotated forward and is located higher than the water discharge outlet. The circulation water discharge port is externally extended from the circulation water outlet and is forward extended with respect to the forward rotation direction. The water discharge port is extended from the water discharge outlet and is forward extended with respect to the forward rotation direction.

According to embodiments disclosed herein, a washing machine may include a cabinet, an outer tub provided within the cabinet, an inner tub to receive laundry, the inner tub provided in the outer tub and being rotatable about a substantially vertical axis, a circulation nozzle to spray water into the inner tub, a circulation hose having a first end coupled to the circulation nozzle, a water discharge hose to allow drainage of water from the outer tub to an outside of the washing machine, and a pump provided below the outer tub and configured to selectively supply water from the outer tub to the circulation hose and the water discharge hose. The pump may include a pump motor that is reversible and rotatable in a first direction and second direction, an impeller rotated by the pump motor, and a pump housing to provide a space in which the impeller is accommodated. The pump housing may include a supply port to receive water from the outer tub, a circulation water discharge port coupled to a second end of the circulation hose and providing a circulation water outlet, and a water discharge port coupled to the water discharge hose and providing a water discharge outlet. The water discharge outlet and the circulation water outlet may be arranged in a circumferential direction and spaced apart from each other on a ring-shaped inner surface of the pump housing.

According to embodiments disclosed herein, a washing machine may include a cabinet supported by a base, at least one tub provided within the cabinet to receive laundry, a circulation nozzle to spray water into the inner tub, a first hose having a first end coupled to the circulation nozzle, a second hose to allow drainage of water from the at least one tub, and a pump provided below the at least one tub on the base and configured to selectively pump water in the at least one tub to one of the first hose and the second hose. The pump may include an impeller, a motor to rotate the impeller in a first direction and a second direction, the first direction and the second direction being opposite directions, and a pump housing having an interior space, the impeller being provided in the interior space, a supply port to receive water from the at least one tub is introduced, a first port coupled to a second end of the first hose and having a first channel for the water from the at least one tub to flow into in the first hose when the impeller is rotated in the first direction, and a second port coupled to the second hose and having a second channel for the water from the at least one tub to flow into the second hose when the impeller is rotated in a second direction. The second port and the first port may be spaced apart from each other and extend out from a circumference of the pump housing.

The washing machine may further include a first prevention rib that protrudes from the inner surface of the pump housing, the first prevention rib formed at a location corresponding to an edge of the first port and a second prevention rib that protrudes from the inner surface of the pump housing, the second prevention rib formed at a location corresponding to an edge of the second port. The first port may be provided at an upstream and the second port is provided at a downstream when the impeller rotates in the first direction. The second port may be provided at an upstream and the first port is provided at a downstream when the impeller rotates in the second direction.

This application relates to U.S. application Ser. Nos. 15/283,488, 15/283,571, 15/283,601, 15/283,662, 15/283,763, all filed on Oct. 3, 2016, which are hereby incorporated by reference in their entirety. Further, one of ordinary skill in the art will recognize that features disclosed in these above-noted applications may be combined in any combination with features disclosed herein.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A washing machine, comprising:
a cabinet;
an outer tub provided within the cabinet;
an inner tub to receive laundry, the inner tub provided in the outer tub and being rotatable about a substantially vertical axis;
a circulation nozzle to spray water into the inner tub;
a circulation hose having a first end coupled to the circulation nozzle;
a water discharge hose to allow drainage of water from the outer tub to an outside of the washing machine;
a pump provided below the outer tub and configured to selectively supply water from the outer tub to the circulation hose and the water discharge hose, the pump including:
a pump motor that is reversible and rotatable in a first direction and second direction;
an impeller rotated by the pump motor; and
a pump housing to provide a space in which the impeller is accommodated, the pump housing including:
a supply port to receive water from the outer tub;
a circulation water discharge port coupled to a second end of the circulation hose and providing a circulation water outlet; and
a water discharge port coupled to the water discharge hose and providing a water discharge outlet, wherein the water discharge outlet and the circulation water outlet are arranged in a circumferential direction and spaced apart from each other on a ring-shaped inner surface of the pump housing;
a water discharge prevention rib that protrudes from the inner surface of the pump housing, the water discharge prevention rib located at a downstream side of the circulation water outlet and at an upstream side of the water discharge outlet; and
a circulation water discharge prevention rib that protrudes from the inner surface of the pump housing, the circulation water discharge prevention rib located at a downstream side of the water discharge outlet and at an upstream side of the circulation water outlet, the upstream side and the downstream side being based on a water current generated when the pump motor rotates in the first direction.

2. The washing machine of claim 1, wherein the circulation water outlet is provided upstream from a water current generated when the impeller rotates in first direction and is located higher than the water discharge outlet, the circulation water discharge port extends from the circulation water outlet in a first direction with respect to the first rotation of the pump motor, and the water discharge port extends from the water discharge outlet in a direction opposite to the first rotation of the pump motor.

3. The washing machine of claim 1, wherein the circulation water discharge port and the water discharge port form an acute angle when the circulation water discharge port and the water discharge port are viewed along a rotational axis of the impeller.

4. The washing machine of claim 3, wherein the circulation water outlet and the water discharge outlet are located in a range of about 140 to 170 degrees around a shaft of the pump motor.

5. The washing machine of claim 1, wherein the water discharge prevention rib is formed at an edge of the water discharge outlet.

6. The washing machine of claim 1, wherein the circulation water discharge prevention rib is formed at an edge of the circulation water outlet.

7. The washing machine of claim 1, wherein at least one of the water discharge prevention rib and the circulation water discharge prevention rib protrudes about 3 mm to 6 mm from the inside surface of the pump housing.

8. The washing machine of claim 7, wherein at least one of the water discharge prevention rib and the circulation water discharge prevention rib protrudes at an oblique angle from the inside surface of the pump housing.

9. The washing machine of claim 8, wherein an arc angle formed between the water discharge prevention rib and the circulation water discharge prevention rib is 75 to 85 degrees.

10. The washing machine of claim 1, wherein centers of the circulation water outlet and the water discharge outlet are spaced apart from each other at a specific interval in a shaft direction of the pump motor.

11. The washing machine of claim 1, wherein the supply port extends along a rotational axis of the pump motor.

12. The washing machine of claim 1, wherein the pump further includes a check valve to selectively open and close the circulation water outlet or the water discharge outlet in response to a rotation direction of the pump motor.

13. The washing machine of claim 12, wherein the check valve is rotatably coupled to the inner surface of the pump housing.

14. The washing machine of claim 12, wherein a rotational axis of the check valve is parallel to a rotational axis of the pump motor.

15. A washing machine, comprising:
a cabinet supported by a base;
at least one tub provided within the cabinet to receive laundry;
a circulation nozzle to spray water into the inner tub;
a first hose having a first end coupled to the circulation nozzle;
a second hose to allow drainage of water from the at least one tub; and
a pump provided below the at least one tub on the base and configured to selectively pump water in the at least one tub to one of the first hose and the second hose, the pump including:
an impeller;
a motor to rotate the impeller in a first direction and a second direction, the first direction and the second direction being opposite directions; and
a pump housing having:
an interior space, the impeller being provided in the interior space;
a supply port to receive water from the at least one tub is introduced;
a first port coupled to a second end of the first hose and having a first channel for the water from the at least one tub to flow into in the first hose when the impeller is rotated in the first direction; and
a second port coupled to the second hose and having a second channel for the water from the at least one tub to flow into the second hose when the impeller is rotated in a second direction, wherein the second port and the first port are spaced apart from each other and extend out from a circumference of the pump housing;
a first prevention rib that protrudes from the inner surface of the pump housing, the first prevention rib formed at a location corresponding to an edge of the first port; and
a second prevention rib that protrudes from the inner surface of the pump housing, the second prevention rib formed at a location corresponding to an edge of the second port.

16. The washing machine of claim 15, wherein the first port is provided at an upstream and the second port is provided at a downstream when the impeller rotates in the first direction.

17. The washing machine of claim 15, wherein the second port is provided at an upstream and the first port is provided at a downstream when the impeller rotates in the second direction.

* * * * *